US011176715B2

(12) United States Patent
Shugrina et al.

(10) Patent No.: US 11,176,715 B2
(45) Date of Patent: Nov. 16, 2021

(54) METHOD AND SYSTEM FOR COLOR REPRESENTATION GENERATION

(71) Applicant: THE GOVERNING COUNCIL OF THE UNIVERSITY OF TORONTO, Toronto (CA)

(72) Inventors: Maria Shugrina, Toronto (CA); Amlan Kar, Toronto (CA); Sanja Fidler, Toronto (CA); Karan Singh, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

(21) Appl. No.: 17/247,043

(22) Filed: Nov. 24, 2020

(65) Prior Publication Data
US 2021/0082159 A1    Mar. 18, 2021

Related U.S. Application Data

(63) Continuation of application No. 16/414,981, filed on May 17, 2019, now Pat. No. 10,896,524.

(60) Provisional application No. 62/673,391, filed on May 18, 2018.

(51) Int. Cl.
*G06T 11/00*    (2006.01)
*G06T 15/50*    (2011.01)
*G06T 11/40*    (2006.01)

(52) U.S. Cl.
CPC ............ *G06T 11/001* (2013.01); *G06T 11/40* (2013.01); *G06T 15/503* (2013.01)

(58) Field of Classification Search
CPC ...... G06T 11/001; G06T 15/503; G06T 11/40
See application file for complete search history.

(56) References Cited

U.S. PATENT DOCUMENTS

| 6,236,406 | B1 | 5/2001 | Li |
| 8,902,234 | B1 | 12/2014 | Sanocki et al. |
| 2004/0075655 | A1 | 4/2004 | Dunnett |
| 2004/0135795 | A1 | 7/2004 | Raubacher et al. |

(Continued)

OTHER PUBLICATIONS

"Adobe. 2017a. Adobe Color CC. https://color.adobe.com (2017)."

(Continued)

*Primary Examiner* — Jennifer Mehmood
*Assistant Examiner* — Andrew Shin
(74) *Attorney, Agent, or Firm* — Bhole IP Law; Anil Bhole; Marc Lampert

(57) ABSTRACT

There is provided a system and method for color representation generation. In an aspect, the method includes: receiving three base colors; receiving a patchwork parameter; and generating a color representation having each of the three base colors at a vertex of a triangular face, the triangular face having a color distribution therein, the color distribution discretized into discrete portions, the amount of discretization based on the patchwork parameter, each discrete portion having an interpolated color determined to be a combination of the base colors at respective coordinates of such discrete portion. In further aspects, one or more color representations are generated based on an input image and can be used to modify colors of a reconstructed image.

16 Claims, 21 Drawing Sheets
(16 of 21 Drawing Sheet(s) Filed in Color)

(56) References Cited

U.S. PATENT DOCUMENTS

| | | | |
|---|---|---|---|
| 2008/0095429 A1* | 4/2008 | Wilensky | G06K 9/342 |
| | | | 382/164 |
| 2013/0207994 A1 | 8/2013 | Rodeski et al. | |
| 2019/0087980 A1 | 3/2019 | Phogat et al. | |
| 2019/0108384 A1* | 4/2019 | Wang | G06K 9/4652 |
| 2019/0385344 A1 | 12/2019 | Martin et al. | |

OTHER PUBLICATIONS

"Adobe. 2017b. Behance. (2017). https://www.behance.net Accessed: Aug. 25, 2017."

"Alvy Ray Smith and Eric Ray Lyons. 1996. HWB—A More Intuitive Hue-BasedColor Model. Journal of Graphics Tools 1, 1 (Jan. 1996), 3-17."

"Alvy Ray Smith.1978. Color gamut transform pairs. In SIGGRAPH. 12-19."

"Baoyuan Wang, Yizhou Yu, Tien-Tsin Wong, Chun Chen, and Ying-Qing Xu. 2010. Data-driven image color theme enhancement. In ACM Trans. on Graphics (TOG), vol. 29. ACM,146."

"Cassidy J Curtis, Sean E Anderson, Joshua E Seims, Kurt W Fleischer, and David H Salesin.1997. Computer-generated watercolor. In Proc. of the 24th annual conference on Computer graphics and interactive techniques. ACM Press/Addison-Wesley Publishing Co.,42".

"Chris Dannen. 2012. The Magical Tech Behind Paper for IPad's Color-Mixing Perfection. https://www.fastcompany.com/3002676/magical-tech-behind-paper-ipads-color-mixing-perfection. (2012)."

"Chuong H.Nguyen, Tobias Ritschel, and Hans-Peter Seidel. 2015. Data-Driven Color Manifolds. ACM Trans. Graph.34, 2( Mar. 2015), 20:1-20:9."

"CIE. 2001. Improvement to industrial colour-difference evaluation. Technical Report 142-2001. Central Bureau of the CIE."

"Colormind.io 2018. Colormind, https://colormind.io/. (2018)."

"COLOURLovers. 2017. COLOURlovers CC. http://www.colourlovers.com. (2017). Accessed: Aug. 25, 2017."

"David Hasler and Sabine Süsstrunk. 2003. Measuring colourfulness in natural images. In Proc. IST/SPIE Electronic Imaging 2003: Human Vision and Electronic Imaging VIII, vol. 5007.87-95."

"Diederik Kingma and Jimmy Ba. 2014. Adam: A method for stochastic optimization. arXiv preprint arXiv: 1412.6980 (2014)."

"Gerald E. Farin. 2002. Curves and surfaces for CAGD: a practical guide. Morgan Kaufmann."

"Google Inc. Google Cultural Instiute. (2017). https://google.com/culturalinstitute/beta/. Accessed Oct. 20, 2017."

"Google. 2017. Custom Search API. https://developers.google.com/custom-search/. (2017)."

"Harry G. Hecht. 1983. A Comparison of the Kubelka-Munk, Rozenberg, and Pitts Giovanelli Methods of Analysis of Diffuse Reflectance for Several Model Systems. Applied Spectroscopy 37, 4 (1983), 315-403."

"Huiwen Chang, Ohad Fried, Yiming Liu, Stephen DiVerdi, and Adam Finkelstein.2015. Palette-based photo recoloring. ACM Trans. on Graphics (TOG) 34,4(2015),139."

"Jianchao Tan, Jyh-Ming Lien, and Yotam Gingold. 2017. Decomposing images into layers via RGB-space geometry. ACM Trans. on Graphics (TOG) 36, 1 (2017), 7."

"Jingwan Lu, Stephen DiVerdi, Willa A Chen, Connelly Barnes, and Adam Finkelstein. 2014. RealPigment: Paint compositing by example. InNPAR.21-30."

"Jonathan Long, Evan Shelhamer, and Trevor Darrell. 2015. Fully convolutional networks for semantic segmentation In Proceedings of the IEEE Conference on Computer Vision and Pattern Recognition. 3431-3440."

"Jun-Yan Zhu, Philipp Krahenbuhl, Eli Shechtman, and Alexei A. Efros. 2016. Generative Visual Manipulation on the Natural Image Manifold. arXiv:1609.03552 (2016)."

"Jun-Yan Zhu, Taesung Park, Phillip Isola, and Alexei A. Efros. 2017. Unpaired Image to-Image Translation using Cycle-Consistent Adversarial Networks. In ICCV."

"Leon A. Gatys, Alexander S .Ecker,and Matthias Bethge.2015. A Neural Algorithm of Artistic Style. arXiv:1508.06576 (2015)."

"Liang-Chieh Chen, George Papandreou, Iasonas Kokkinos, Kevin Murphy, and Alan L Yuille. 2016. Deeplab: Semantic image segmentation with deep convolutional nets, atrous convolution,and fully connected crfs. arXivpreprintarXiv: 1606.00915 (2016)."

"Mari Sheibley. 2013. Mobile Patterns. (2013). https://www.mobile-patterns.com. Accessed: Aug. 25, 2017."

"Maria Shugrina, Jingwan Lu, and Stephen Diverdi. 2017. Playful palette: an interactive parametric color mixer for artists. ACM Trans. on Graphics (TOG) 36, 4 (2017), 61."

"Michelle A Borkin, Azalea A Vo, Zoya Bylinskii, Phillip Isola, Shashank Sunkavalli, Aude Oliva,and Hans peter Pfister. 2013. What makes a visualization memorable? IEEE Trans. on Visualization and Computer Graphics 19,12 (2013),2306-2315."

"Nicolas Mellado, David Vanderhaeghe, Charlotte Hoarau, Sidonie Christophe, Mathieu Brédif, and Loic Barthe. 2017. Constrained palette-space exploration. ACM Trans. on Graphics (TOG) 36, 4 (2017), 60."

"Office Action for U.S. Appl. No. 29/635,278, United States Patent & Trademark Office, dated Feb. 14, 2020".

"Olaf Ronneberger, Philipp Fischer, and Thomas Brox. 2015. U-net: Convolutional networks for biomedical image segmentation. In International Conference on Medical Image Computing and Computer-Assisted Intervention. Springer,234-241."

"Paper Fifty Three Inc. 2017. Paper by FiftyThree—Sketch, Diagram, Take Notes. https://ituns.apple.com/us/app/paper-by-fiftythree-sketch/id506003812?mt=8. (2017)."

"Patsorn Sangkloy, Jingwan Lu, Chen Fang, Fisher Yu, and James Hays. 2017. Scribbler: Controlling Deep Image Synthesis with Sketch and Color. Computer Vision and Pattern Recognition, CVPR (2017)."

"Peter O'Donovan, Aseem Agarwala, and Aaron Hertzmann. 2011. Color compatibility from large datasets. ACM Trans. on Graphics (TOG) 30, 4 (2011), 63."

"Peter O'Donovan, Aseem Agarwala, and Aaron Hertzmann. 2014. Collaborative filtering of color aesthetics. Computational Aesthetics (2014), 33-40."

"Pinterest. 2017. Pinterest (2017). https://www.pinterest.com. Accessed: Aug. 25, 2017."

"Preferred Networks Inc. 2017. PaintChainer. (2017). https://paintschainer.preferred.tech/index_en.html. Accessed: Dec. 25, 2017."

"Richard Zhang, Jun-Yan Zhu, Phillip Isola, Xinyang Geng, Angela S Lin, Tianhe Yu, and Alexei A Efros. 2017. Real-time user-guided image colorization with learned deep priors. CoRR abs/cs/0605035 cs.CV (2017)."

"Sharon Lin and Pat Hanrahan. 2013. Modeling how people extract color themes from images. In Proc. of the SIGCHI Conference on Human Factors in Computing Systems. ACM,3101-3110."

"Sharon Lin, Daniel Ritchie, Matthew Fisher, and Pat Hanrahan. 2013. Probabilistic color-by-numbers: Suggesting pattern colorizations using factor graphs. ACM Trans. on Graphics (TOG) 32, 4 (2013), 37."

"Shelby White, 2010, Design Inspiration. (2010), https://www.designspiration.net/. Accessed: Aug. 25, 2017."

"Time Inc. 2017. Fortune 500. (2017). https://fortune.com/fortune500/. Accessed: Jul. 20, 2017."

"Xiaojuan Qi, Renjie Liao, Jiaya Jia, Sanja Fidler, and Raquel Urtasun. 2017. 3dgraph neural networks for rgbd semantic segmentation. In Proc. of the IEEE Conference on Computer Vision and Pattern Recognition.5199-5208."

"Xiaowu Chen, Dongqing Zou, Jian wei Li, Xiaochun Cao, Qinping Zhao, and Hao Zhang. 2014. Sparse dictionary learning for edit propagation of high-resolution images.In Proc. of the IEEE Conference on Computer Vision and Pattern Recognition.2854-2861."

"Xiaoyong Shen, Aaron Hertzmann, Jiaya Jia, Sylvain Paris, Brian Price, Eli Shechtman, and Ian Sachs. 2016. Automatic portrait segmentation for image stylization. In Computer Graphics Forum, vol. 35. Wiley Online Library, 93-102."

"Yagiz Aksoy,Tae-Hyun Oh,Sylvain Paris, Marc Pollefeys, and Wojciech Matusik.2018. Semantic Soft Segmentation. ACM Trans. on Graphics (TOG) 37,4(2018),72:1-72:13."

(56) References Cited

OTHER PUBLICATIONS

"Yagiz Aksoy,Tunc Ozan Aydin,Aljosa Smolic, and Marc Pollefeys. 2017. Unmixing based soft color segmentation for image manipulation. ACM Trans. on Graphics (TOG) 36,2(2017), 19."

"Yoshio Okumura. 2005. Developing a spectral and colorimetric database of artist paint materials. Master's thesis. Rochester Institute of Technology."

Patterson, Steve, "Create Custom Photoshop Color Swatches and Sets", published and archived at archive.org as early as Oct. 1, 2017, https://www.photoshopessentials.com/basics/customswatches/#:~:text=Choosing % 20A % 20New % 20B ackground % 20Color% 20From % 20The% 20Swatches % 20Palette&text=Hold % 20down % 20 % 22Ctrl % 22 % 20(Win,use % 20as % 20your% 20Background % 20color .&text=The % 20Background % 20color% 20swatch % 20in,selected % 20in % 20the % 20Swatches % 20palette.

WebTools, "Paletton Create Naturally Beautiful Color Schemes", video published as of Jan. 15, 2018 at https://www.youtube.com/watch?v=oRIqZqRIBnQ as of Jan. 15, 2018, which is a video tutorial of https://Paletton.com website tool archived on archive.org as early as Jun. 20, 2014.

\* cited by examiner patchwork $s = 2$ patchwork $s = 5$ patchwork $s = 10$ linear RGB vs. acrylic paints color sail blending, varying w effect of wind on color example patch histogram entropy and image colorfulness values colorfulness patch entropy

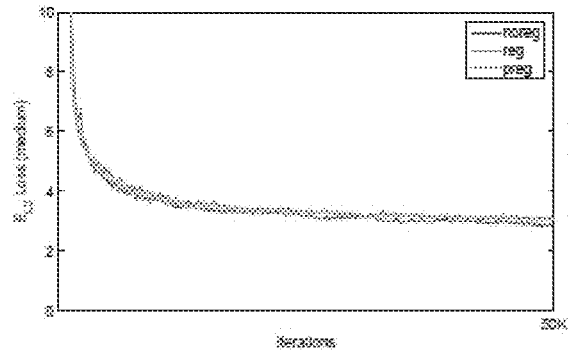
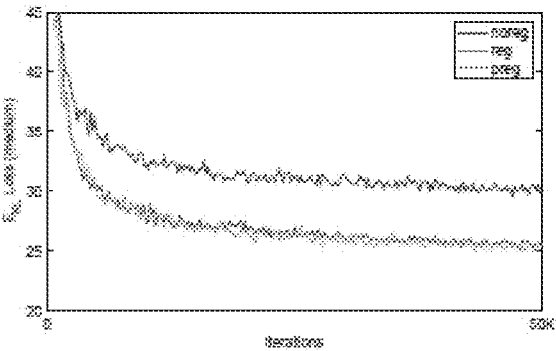
$E_{L2}$ plot, unnormalized for 32x32
FIG. 13A
$E_{KL}$ plot
FIG. 13B
triplets of (input, "noreg" palette, "patchreg" palette)
FIG. 13C Results on art types Results on hardness Maximal barely noticeable difference in $E_\%$ (we use $\delta = 10$).

Results on challenging patches

METHOD AND SYSTEM FOR COLOR REPRESENTATION GENERATION

TECHNICAL FIELD

The following relates generally to color representations, and more specifically, to a computer-based method and system for color representation generation.

BACKGROUND

Color is one of the key components in art and design for, for example, images, graphics, videos and other electronic content. Additionally, how various colors interact, collaborate or contrast, colloquially called a "color theme," plays an important role in the visual aesthetics and appeal of a visual work. As an example, a creator's choice of a color theme can set the mood for a film, or the accent color selected for a website can radically change the way it is perceived. While a color theme is important to any visual creation, conventional "color palettes" can be inefficient and not particularly user-friendly.

It is therefore an object of the present invention to provide a method and system in which the above disadvantages are obviated or mitigated and attainment of the desirable attributes is facilitated.

SUMMARY

In an aspect, there is provided a computer-implemented method for generating a color representation, the method comprising: receiving three base colors; receiving a patchwork parameter; and generating a color representation having each of the three base colors at a vertex of a triangular face, the triangular face having a color distribution therein, the color distribution discretized into discrete portions, the amount of discretization based on the patchwork parameter, each discrete portion having an interpolated color determined to be a combination of the base colors at respective coordinates of such discrete portion.

In a particular case of the method, the combination of the base colors for each discrete portion comprises a linear combination of the base colors.

In another case, the three base colors and the color distribution are in red-green-blue (RGB) color space.

In yet another case, the amount of discretization comprises a range from only the color of the vertices to approximately continuous.

In yet another case, each discrete portion comprises a triangle shape.

In yet another case, the interpolated color further comprises an average of the colors of neighbouring discrete portions.

In yet another case, the method further comprising: receiving a wind parameter; receiving coordinates of a focal point on the triangular face; and modifying blending behavior of the color distribution based on the wind parameter acting at the focal point.

In yet another case, the respective coordinates of the discrete portion comprise barycentric coordinates of the discrete portion with respect to the vertices, and the coordinates of a focal point comprise barycentric coordinates of the focal point with respect to the vertices.

In yet another case, blending interpolation is biased toward colors closest to the focal point.

In yet another case, the modification of the blending behavior uses a cubic Bezier triangle.

In another aspect, there is provided a system for generating a color representation, the system comprising one or more processors and a data storage, the one or more processors configured to execute a representation module to: receive three base colors; receive a patchwork parameter; and generate a color representation having each of the three base colors at a vertex of a triangular face, the triangular face having a color distribution therein, the color distribution discretized into discrete portions, the amount of discretization based on the patchwork parameter, each discrete portion having an interpolated color determined to be a combination of the base colors at respective coordinates of such discrete portion.

In a particular case of the system, the combination of the base colors for each discrete portion comprises a linear combination of the base colors.

In another case, the three base colors and the color distribution are in red-green-blue (RGB) color space.

In yet another case, the amount of discretization comprises a range from only the color of the vertices to approximately continuous.

In yet another case, each discrete portion comprises a triangle shape.

In yet another case, the interpolated color further comprises an average of the colors of neighbouring discrete portions.

In yet another case, the representation module further: receives a wind parameter; receives coordinates of a focal point on the triangular face; and modifies blending behavior of the color distribution based on the wind parameter acting at the focal point.

In yet another case, the respective coordinates of the discrete portion comprise barycentric coordinates of the discrete portion with respect to the vertices, and the coordinates of a focal point comprise barycentric coordinates of the focal point with respect to the vertices.

In yet another case, blending interpolation is biased toward colors closest to the focal point.

In yet another case, the modification of the blending behavior uses a cubic Bezier triangle.

In another aspect, there is provided a computer-implemented method for generating a color representation, the method comprising: receiving an input image; determining a set of input colors in the input image; generating a color representation having a base color at each of three vertices that define a triangular face, the triangular face having a color distribution determined by a set of parameters comprising the base color at each of the three vertices and a patchwork parameter; and using a trained neural network, determining a value for the set of parameters that minimize an error metric between the input colors and the colors in the color distribution.

In a particular case of the method, the set of parameters further comprising a focal point parameter and a wind parameter.

In another case, the color distribution comprises a histogram of bins in Red-Green-Blue (RGB) color space provided as input to the trained neural network.

In yet another case, the bin values are normalized.

In yet another case, input to the trained neural network comprises error metrics on pixel colors in the input image.

In yet another case, the error metrics comprise a greedy Red-Green-Blue (RGB) reconstruction loss and a fraction of colors in the color distribution that have a relevance to the color representation above a predetermined threshold.

In yet another case, the method further comprising determining the relevance comprising performing Kullback-Leibler divergence.

In yet another case, determining the divergence further comprises determining histograms for patches of the input image; taking a maximum for each patch; and normalizing the maximums.

In yet another case, the method further comprising: mapping each portion of the color representation with a color that is closest to a pixel or group of pixels in the input image; receiving a modification to any one of the set of parameters; regenerating the color representation with the modified parameter; and recoloring each pixel or group of pixels in the input image to the color value of the mapped portion of the color representation.

In another aspect, there is provided a system for generating a color representation, the system comprising one or more processors and a data storage, the one or more processors configured to execute: a representation module to: receive an input image; determine a set of input colors in the input image; and generate a color representation having a base color at each of three vertices that define a triangular face, the triangular face having a color distribution determined by a set of parameters comprising the base color at each of the three vertices and a patchwork parameter; and a mapping module to: using a trained neural network, determine a value for the set of parameters that minimize an error metric between the input colors and the colors in the color distribution.

In a particular case of the system, the set of parameters further comprising a focal point parameter and a wind parameter.

In another case, the color distribution comprises a histogram of bins in Red-Green-Blue (RGB) color space provided as input to the trained neural network.

In yet another case, the bin values are normalized.

In yet another case, input to the trained neural network comprises error metrics on pixel colors in the input image.

In yet another case, the error metrics comprise a greedy Red-Green-Blue (RGB) reconstruction loss and a fraction of colors in the color distribution that have a relevance to the color representation above a predetermined threshold.

In yet another case, the mapping module further determines the relevance comprising performing Kullback-Leibler divergence.

In yet another case, determining the divergence further comprises determining histograms for patches of the input image; taking a maximum for each patch; and normalizing the maximums.

In yet another case, the mapping module further maps each portion of the color representation with a color that is closest to a pixel or group of pixels in the input image; and wherein the representation module further: receives a modification to any one of the set of parameters; regenerates the color representation with the modified parameter; and recolors each pixel or group of pixels in the input image to the color value of the mapped portion of the color representation.

In another aspect, there is provided a computer-implemented method for color representation generation, the method comprising: receiving an input image; using a trained second neural network, mapping one or more alpha masks to one or more color regions of the input image; generating a stacked image comprising a stacking of the one or more alpha masks; determining one or more input colors in each of the one or more alpha masks; generating a color representation for each of the one or more alpha masks, each color representation having a base color at each of three vertices that define a triangular face, the triangular face having a color distribution determined by a set of parameters comprising the base color at each of the three vertices and a patchwork parameter; using a trained first neural network, determining a value for each of the set of parameters that minimize an error metric between the input colors of the respective alpha mask and the colors in the respective color distribution.

In a particular case of the method, the second neural network is a Recurrent Neural Network (RNN).

In another case, the RNN comprises successively predicting and modifying the alpha masks and the color representations by moving attention to different areas of the input image.

In yet another case, mapping the one or more alpha masks to the one or more color regions of the input image comprises predicting one alpha mask and color representation at a time by successively analyzing different patches of the input image that have not yet been analyzed until the whole input image has been analyzed.

In yet another case, mapping the one or more alpha masks to the one or more color regions of the input image comprises receiving input from a user for the one or more color regions to be mapped.

In yet another case, the alpha masks are a grayscale image, and wherein each pixel of the alpha mask encodes how much the corresponding color region contributes to its actual color.

In yet another case, a sum of all the alpha masks for each pixel is equal to 1.

In yet another case, the set of parameters further comprising a focal point parameter and a wind parameter.

In yet another case, the method further comprising: mapping each portion of each of the color representations with a color that is closest to a pixel or group of pixels in the respective alpha mask; receiving a modification to any one of the set of parameters of any of the color representations; regenerating the color representation with the modified parameter; and recoloring each pixel or group of pixels in the input image to the color value of the mapped portion of the color representation.

In another aspect, there is provided a system for generating a color representation, the system comprising one or more processors and a data storage, the one or more processors configured to execute: a mapping module to: using a trained second neural network, mapping one or more alpha masks to one or more color regions of a received input image; and a representation module to: generate a stacked image comprising a stacking of the one or more alpha masks; determine one or more input colors in each of the one or more alpha masks; and generating a color representation for each of the one or more alpha masks, each color representation having a base color at each of three vertices that define a triangular face, the triangular face having a color distribution determined by a set of parameters comprising the base color at each of the three vertices and a patchwork parameter, wherein, using a trained first neural network, the mapping module determines a value for each of the set of parameters that minimize an error metric between the input colors of the respective alpha mask and the colors in the respective color distribution.

In a particular case of the system, the second neural network is a Recurrent Neural Network (RNN).

In another case, the RNN comprises successively predicting and modifying the alpha masks and the color representations by moving attention to different areas of the input image.

In yet another case, mapping the one or more alpha masks to the one or more color regions of the input image comprises predicting one alpha mask and color representation at a time by successively analyzing different patches of the input image that have not yet been analyzed until the whole input image has been analyzed.

In yet another case, mapping the one or more alpha masks to the one or more color regions of the input image comprises receiving input from a user for the one or more color regions to be mapped.

In yet another case, the alpha masks are a grayscale image, and wherein each pixel of the alpha mask encodes how much the corresponding color region contributes to its actual color.

In yet another case, a sum of all the alpha masks for each pixel is equal to 1.

In yet another case, the set of parameters further comprising a focal point parameter and a wind parameter.

In yet another case, the mapping module further maps each portion of each of the color representations with a color that is closest to a pixel or group of pixels in the respective alpha mask; and wherein the representation module further: receives a modification to any one of the set of parameters of any of the color representations; regenerates the color representation with the modified parameter; and recolors each pixel or group of pixels in the input image to the color value of the mapped portion of the color representation.

In another aspect, there is provided a computer-implemented method for color representation generation, the method comprising: receiving an input image; receiving a user-selected region of the input image; using a trained third neural network, mapping a first alpha mask to the user-selected region and a second alpha mask to the background of the input image; generating a color representation for at least the first alpha mask, each color representation having a base color at each of three vertices that define a triangular face, the triangular face having a color distribution determined by a set of parameters comprising the base color at each of the three vertices and a patchwork parameter; using a trained first neural network, determining a value for each of the set of parameters that minimize an error metric between the input colors of the respective alpha mask and the colors in the respective color distribution.

In a particular case of the method, the first alpha mask and the second alpha mask sum to 1 at every pixel of the input image.

In another case, the third neural network is trained using labelled data comprising one or more input images each with regions of interest labelled by a user.

In yet another case, the first neural network minimizing a loss comprising reconstruction loss of the alpha masks and intersection over union (IOU) with the user-provided regions of interest.

In yet another case, the third neural network is trained using unlabelled data by minimizing loss, the loss comprising Least Square Errors (L2) loss, area loss, and adversarial loss.

In yet another case, the Least Square Errors (L2) loss comprises determining a pixel-wise comparison between the input image and a reconstructed image determined by substituting colors of pixels in the first alpha mask with best matching colors in the predicted color representation.

In yet another case, the method further comprising determining the area loss comprising performing: starting from a sampled point in a training image, using a flood fill algorithm to define a region of similar colors around the point; and determining the area loss as a sum of each region multiplied by the difference between the region and a corresponding predicted mask.

In yet another case, the method further comprising determining the adversarial loss comprising training a discriminator network and evaluating it on the output of the third neural network.

In yet another case, training the discriminator network comprises: generating a training mask and a predicted color representation; generating edited images by randomly recoloring the input image by perturbing one or several of the predicted color representation base colors; and training the discriminator network to distinguish the edited images from the input image.

In yet another case, the adversarial loss is regularized using a weighted addition of the Least Square Errors (L2) loss and the area loss.

In another aspect, there is provided a system for generating a color representation, the system comprising one or more processors and a data storage, the one or more processors configured to execute: a mapping module to: receive a user-selected region of a received input image; and using a trained third neural network, map a first alpha mask to the user-selected region and a second alpha mask to the background of the input image; a representation module to: generate a color representation for at least the first alpha mask, each color representation having a base color at each of three vertices that define a triangular face, the triangular face having a color distribution determined by a set of parameters comprising the base color at each of the three vertices and a patchwork parameter, wherein the mapping module, using a trained first neural network, determines a value for each of the set of parameters that minimize an error metric between the input colors of the respective alpha mask and the colors in the respective color distribution.

In a particular case of the system, the first alpha mask and the second alpha mask sum to 1 at every pixel of the input image.

In another case, the third neural network is trained using labelled data comprising one or more input images each with regions of interest labelled by a user.

In yet another case, the first neural network minimizing a loss comprising reconstruction loss of the alpha masks and intersection over union (IOU) with the user-provided regions of interest.

In yet another case, the third neural network is trained using unlabelled data by minimizing loss, the loss comprising Least Square Errors (L2) loss, area loss, and adversarial loss.

In yet another case, the Least Square Errors (L2) loss comprises determining a pixel-wise comparison between the input image and a reconstructed image determined by substituting colors of pixels in the first alpha mask with best matching colors in the predicted color representation.

In yet another case, the area loss comprises performing: starting from a sampled point in a training image, using a flood fill algorithm to define a region of similar colors around the point; and determining the area loss as a sum of each region multiplied by the difference between the region and a corresponding predicted mask.

In yet another case, the adversarial loss comprises training a discriminator network and evaluating it on the output of the third neural network.

In yet another case, training the discriminator network comprises: generating a training mask and a predicted color representation; generating edited images by randomly recoloring the input image by perturbing one or several of the predicted color representation base colors; and training the discriminator network to distinguish the edited images from the input image.

In yet another case, the adversarial loss is regularized using a weighted addition of the Least Square Errors (L2) loss and the area loss.

These and other embodiments are contemplated and described herein. It will be appreciated that the foregoing summary sets out representative aspects of systems and methods to assist skilled readers in understanding the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The features of the invention will become more apparent in the following detailed description in which reference is made to the appended drawings wherein:

FIG. 13A is chart showing greedy $L_2$ RGB reconstruction loss values for experimental datasets;

FIG. 13B is a chart showing Kullback-Leibler divergence values for experimental datasets;

FIG. 13C illustrates examples of input images and associated color sails on experimental data having unregularized learning, regularized learning computed over an entire patch, and regularized learning computed over smaller sub-patches, respectively;

DETAILED DESCRIPTION

Figure 1:
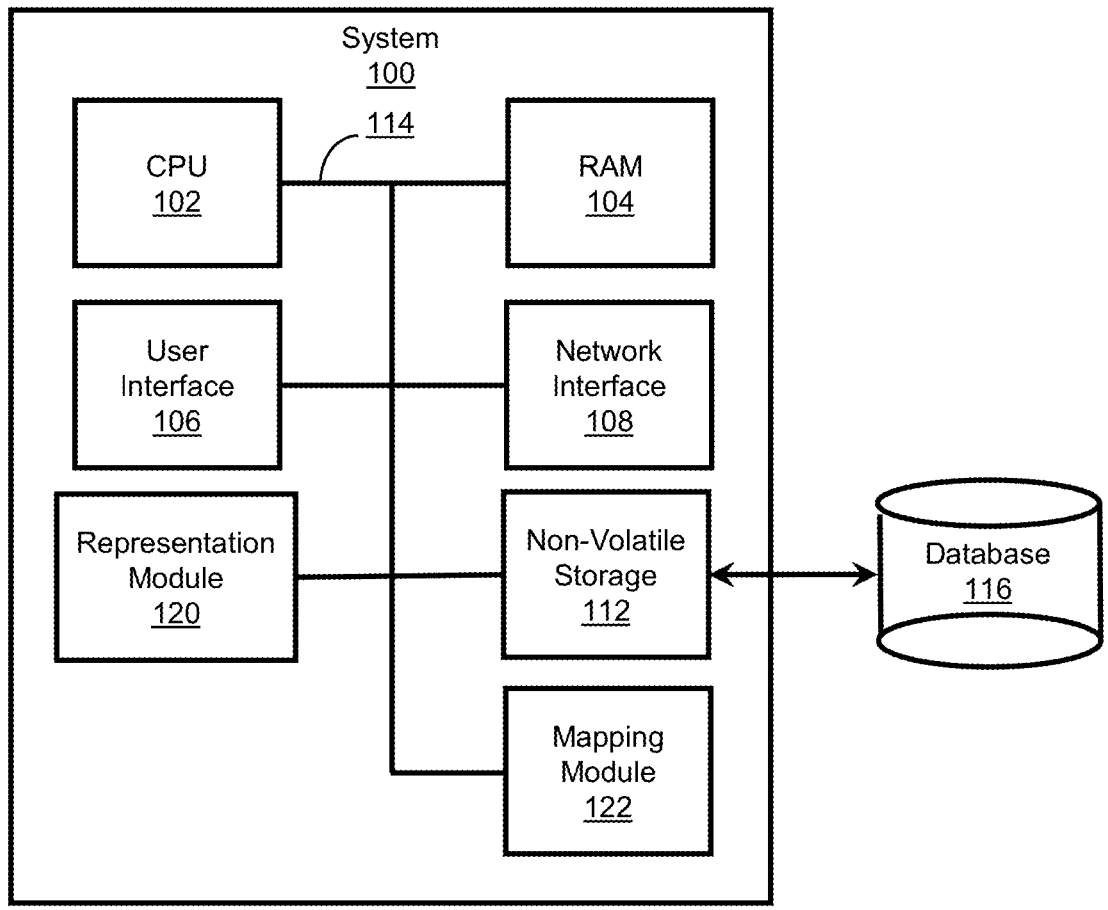
FIG. 1 is a schematic diagram of a system for color representation generation, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to color representations, and more specifically, to a computer-based method and system for color representation generation.

While, generally, a "color theme" is vital to any visual creation, conventional color representations are generally not available that can span various domains where both discrete and continuous color distributions may be required; for example, painting, illustration, graphic and user interface design. In the embodiments described herein, there are provided approaches to generating color representations, referred to as one or more "color sails," that offer a discrete-continuous color gamut representation that is compact, interactive and can be integrated for color exploration.

The embodiments described herein provide a discrete-continuous color representation that provides a color gradient analogous to three dimensions and allows control of the color blending behavior. The embodiments described herein can model a wide variety of color distributions in a compact manner, and efficiently lends itself to applications such as color exploration for graphic design, illustration and similar fields.

Additionally, the embodiments described herein provide a neural network that can fit a color sail to an image. The user can then adjust color sail parameters to change the base colors, their blending behavior and the number of colors, to easily explore a wide range of possibilities. In addition, a Deep Learning model is provided to automatically segment an image into color-compatible alpha masks, each equipped with its own color sail. Advantageously, this can allow for targeted color exploration by, for example, editing a corresponding color sail.

Conventionally, discrete color palettes, typically comprised of 5-10 colors, for various color related task; for example, recoloring, color theme extraction, and machine learning of color aesthetics. While discrete color palettes may be suitable for some design domains, for example user interface design, they are a poor representation for much larger, continuous color distributions found in other applications of art and design, for example, illustration, graphic design, and photography. Advantageously, the present embodiments provide a color representation that can combine the simplicity of discrete color palettes with representational power and versatility.

As described herein, each color sail represents a patch of RGB space with, in some cases, four interactive controls: three controls where each is a color to define the color interpolation space, and a fourth control that modifies the shape of the gradient. As described herein, this allows "bending" the color distribution by putting "wind" into the sail, approximating a variety of non-linear color blending behaviors. In addition, in some cases, a color sail can have a parameter for the level of discretization, making it possible to represent a range of color palettes from very coarse to visually continuous. In some embodiments, the system can automatically infer a small set of color sails for an image, and map each to a meaningful image region; allowing easy recoloring of images by interacting with the sail controls. Unlike some approaches that are typically limited to artwork created with custom palette interfaces, the present embodiments can work with almost any design. While the present embodiments are directed to RGB space, it is contemplated that the embodiments disclosed herein can use any applicable color space.

In the present disclosure, generation of color sail color representations are provided to offer a compact and interactive color gamut representation, able to model both discrete and continuous distributions. Additionally, color sails can be generated as a fully differentiable module compatible with deep learning architecture. In addition, a neural network is provided that fits a color sail to a color distribution by learning from blending behavior in image patches. In addition, in some cases, to represent more varied color distributions, a deep learning model is provided that learns to segment images into soft regions, each fitted with its own color sail.

Conventional discrete color palettes, consisting of a small (typically 5) number of solid color swatches, can be used as a representation of color combinations in design applications. Discrete representations are generally easy to construct and share. However, color distributions of many images are not well-modeled by small discrete sets of colors, limiting the applicability of discrete color palettes. Unlike discrete color palettes, color gamuts consisting of a large number of colors generally have no canonical representation making them generally harder to construct, analyze and edit. Some approaches fit color manifolds to collections of images, but such color manifold representations are generally not editable once constructed and require a large amount of data to approximate. Other approaches use compact continuous palette representations, focusing on its interactive qualities; but such approach is not well-suited to a discrete setting, cannot be modelled to non-linear blending behavior, and is not structured for data-driven analysis. The present embodiments can advantageously provide a structured representation that can span a range from discrete to continuous color palettes, while modeling a variety of color blending behaviors and allowing interactive editing.

Digital color interpolation is a direct consequence of the way color is represented. Linear interpolation in different color spaces (for example, CIELAB, HSV, HWB and RGB) can result in vastly different gradients. Typically, graphic design software exposes only RGB interpolation due to its simplicity. However, RGB blending can result in grayish tones when transitioning from one vibrant color to another (e.g. blue to yellow). Some approaches hand-tune the blending behavior of paint pairs to look more pleasing. Other approaches model a physical blending of paints, for example, to simulate watercolor. Other approaches take a data-driven approach and learn blending and compositing behavior of a particular set of paints from examples. Rather than having to use a particular alternative approach to linear RGB interpolation, the present embodiments provide an approach to model a variety of blending behaviors with a parameter of the color sail, referred to as a "wind" parameter. In some cases, control of this parameter is provided to the user. In further cases, control of this parameter can be restricted, for example, to better match a particular medium in a more targeted application.

Some approaches provide extracting of a discrete color palette from an image and allowing changes to it to recolor an image. However, because the palette in this approach is discrete, it allows users only indirect control over the resulting colors. In some cases, the transformations are also applied to the image globally. In the present embodiments, color sails can be used to model an entire color distribution; thus, allowing the user to shift emphasis from one color to the other, or to adjust color blending behavior. In addition, the present embodiments can allow for finer control by fitting multiple palettes to regions of the image. Some other approaches allow the user to recolor the image by changing a continuous palette; but such approaches generally only apply to images created with a corresponding palette interface. In contrast, the present embodiments can be used with a number of different designs. Further approaches have user-guided systems for grayscale image colorization. While these approaches can learn image semantics for colorization, they generally cannot edit an image that already contains color. With the present embodiments, color choices in a design can be explored where color relationships have already been defined by the creator.

Various approaches can be used in the computer vision field for segmenting an image into regions in a variety of contexts, including portrait segmentation for image editing. While these approaches leverage data to infer image semantics, they generally do not allow direct color-based manipulation of the segmented regions. Other approaches use color segmentation with the aim of splitting an image into soft or hard regions. While these approaches provide useful layer segmentation of the image for editing, they do not generally encode color relationships within image regions because they work with constant color mats. In contrast, the present embodiments represent color distributions in a more flexible way. This, in some cases together with a deep learning architecture capable of learning from image data, allows the present embodiments to segment images in a way that generally does not rely solely on color and position cues, a property that can be useful for more semantic aware image editing.

The present embodiments provide approaches using deep learning techniques for image manipulation. In this way, machine learning techniques can be used to produce a set of user controls (for example, alpha masks and color sail palettes) that give users direct control to easily recolor images.

Advantageously, color sails as described herein can extend the appealing properties of discrete palettes with a representation that can model and represent more varied color distributions. Thus, in some cases, these representations can be sparse (comprised of few degrees of freedom), interactive (easy to construct and edit interactively), learnable (well-structured for learning and statistical analysis), and versatile (potentially represent a wide array of color distributions).

Figure 2:
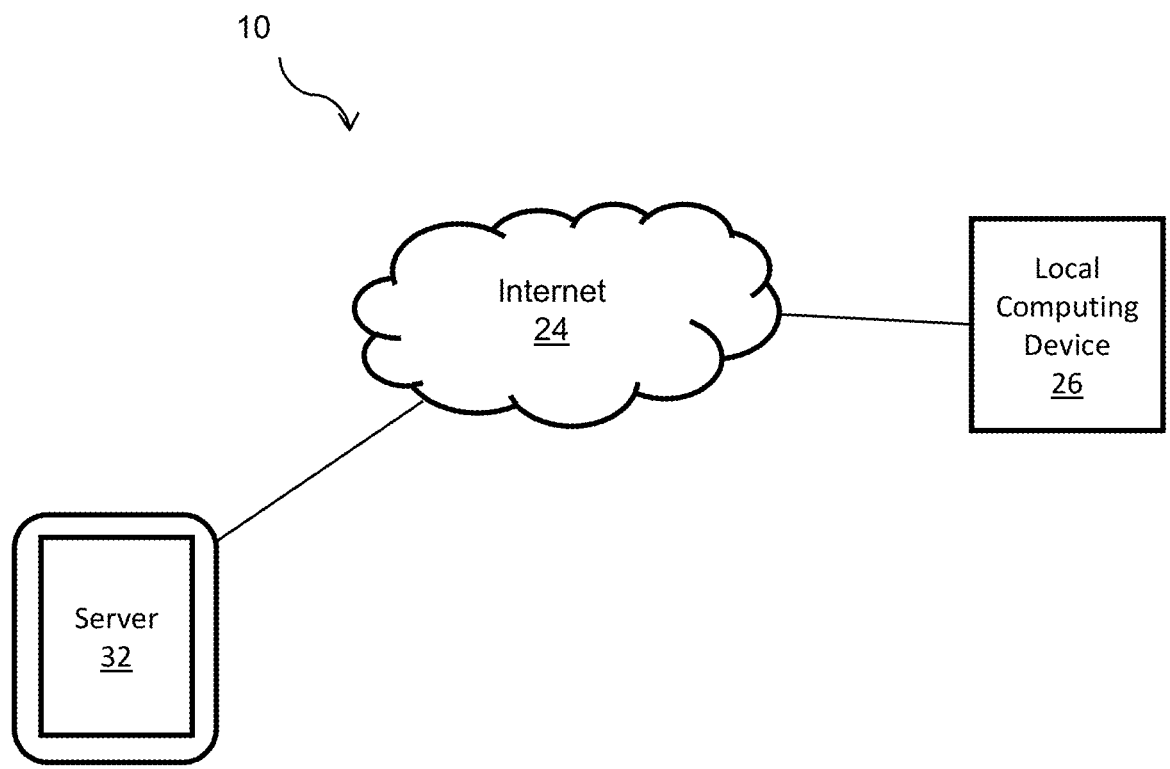
FIG. 2 is a schematic diagram showing the system of FIG. 1 and an exemplary operating environment.

Referring now to FIG. 1, a system 100 for color representation generation, in accordance with an embodiment, is shown. In this embodiment, the system 100 is run on a local computing device (26 in FIG. 2). In further embodiments, the local computing device 26 can have access to content located on a server (32 in FIG. 2) over a network, such as the internet (24 in FIG. 2). In further embodiments, the system 100, or operations performed by the system 100, can be run on any suitable computing device; for example, the server (32 in FIG. 2).

In some embodiments, the components of the system 100 are stored by and executed on a single computer system. In other embodiments, the components of the system 100 are distributed among two or more computer systems that may be locally or remotely distributed.

FIG. 1 shows various physical and logical components of an embodiment of the system 100. As shown, the system 100 has a number of physical and logical components, including a central processing unit ("CPU") 102 (comprising one or more processors), random access memory ("RAM") 104, a user interface 106, a network interface 108, non-volatile storage 112, and a local bus 114 enabling CPU 102 to communicate with the other components. In some cases, at least some of the one or more processors can be graphical processing units. CPU 102 executes an operating system, and various modules, as described below in greater detail. RAM 104 provides relatively responsive volatile storage to CPU 102. The user interface 106 enables an administrator or user to provide input via an input device, for example a keyboard and mouse. The user interface 106 can also output information to output devices to the user, such as a display and/or speakers. The network interface 108 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data can be stored in a database 116. During operation of the system 100, the operating system, the modules, and the related data may be retrieved from the non-volatile storage 112 and placed in RAM 104 to facilitate execution. In further cases, some operations of the CPU 102 can be facilitated on a remote device; for example, operations can be performed on the server 32 and displayed locally on the user interface 106.

In an embodiment, the system 100 further includes a representation module 120 and a mapping module 122 that can be executed on the CPU 102. In some cases, the functions and/or operations of the representation module 120 and the mapping module 122 can be combined or executed on other modules.

Figure 4:
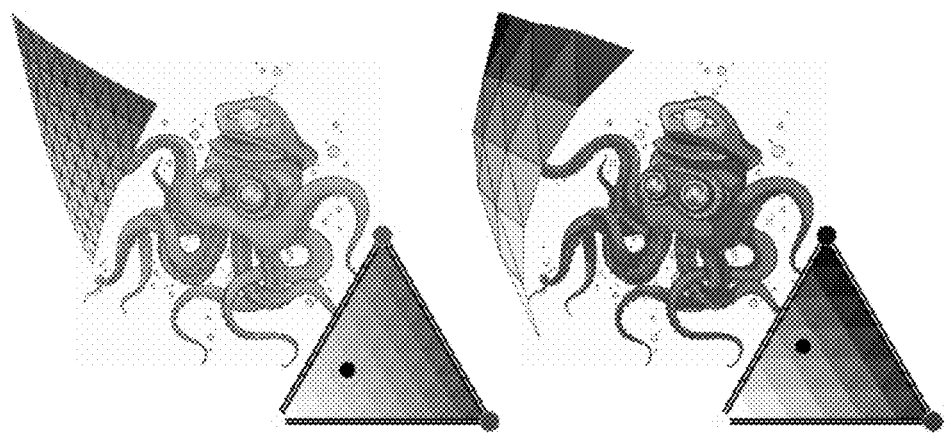
FIG. 4 illustrates exemplary color sails and associated images in accordance with the system of FIG. 1.
Figure 4:
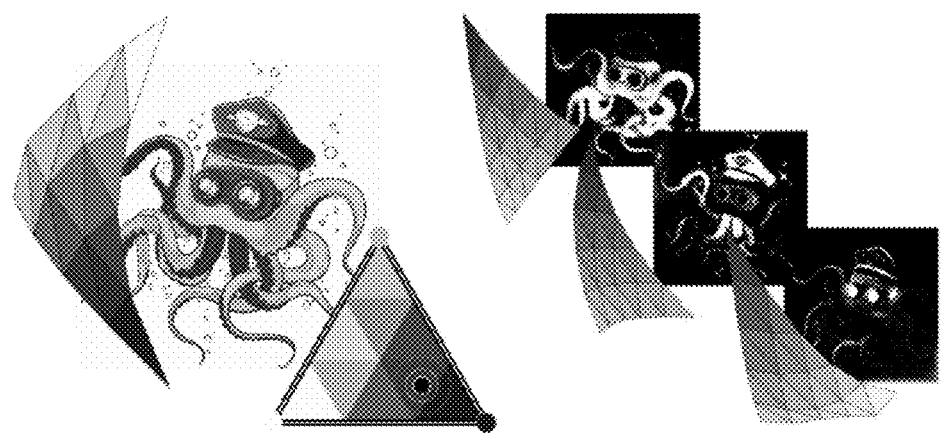

The system 100 provides an approach for representing a color distribution using one or more color sails. Each color sail being, in some cases, a triangular patch in RGB (or alternate color space), defined by linear or non-linear blending of its vertex colors. In addition, in some cases, each color sail has a wind parameter, which represents a blending behaviour of the triangular patch; inflating it into a sail-like shape, and thus controlling blending behavior smoothly (see, for example, FIG. 4). In some cases, each sail is associated with a patchwork parameter that determines how many distinct colors are present in the sail. For example, a patchwork setting of 0 causes the sail to only have its 3 vertex colors, whereas a patchwork setting of 15 visually approaches a continuous distribution (see, for example, FIGS. 5D to 5F).

In a particular embodiment, as shown in the example of FIGS. 5A to 5F, each color sail $\mathcal{S}$ can be defined by the following parameters:

vertex colors $V=[v_0, v_1, v_2]$: RGB colors of the 3 vertices;
patchwork s: an integer parameter for the subdivision level of the triangle, taking on values 0 and above;
focus point $(p_u, p_v)$: barycentric coordinates of the point within the triangular patch on which a wind is acting; and
wind w: a single float value, defining how much the sail is inflated upwind (positive) or downwind (negative).

While this color representation is compact and simple, it can nonetheless be used to model a variety of complex real-world gamuts. As described below, the effect of the above parameters on the color distribution represented by the color sail can be explained by first explaining the color sail's discrete-continuous nature and then the effect of wind on the blending behavior.

The representation module 120 defines or receives three vertex colors $(v_0, v_1, v_2)$. The vertex colors are used to define a flat triangular face in RGB space (or other color space), with color at every point resulting from a smooth continuous interpolation of the vertex colors. In further cases, the colors at points in the triangular face can be defined discretely with discrete color distributions. For example, a graphic designer may choose to create a few discrete shading options in a flyer, rather than working with a smoothly varying gradient.

The representation module 120 defines or receives the patchwork parameters to set a subdivision level of the sail triangle. Where discrete gamuts are associated with small values of s and gamuts visually approaching continuous color distributions for higher values of s (See, for example, FIGS. 5D to 5F). Let $C\mathcal{S}=\{c_1 \ldots c_n\}$ be the discrete set of colors in the distribution defined by the color sail $\mathcal{S}$. Each interpolated color can be defined as a linear combination of the vertex colors: $c_i=u_{i0}v_0+u_{i1}v_1+u_{i2}v_2=Vu_i$, where the sum $u_{i0}+u_{i1}+u_{i2}$ is constrained to be 1 for all i. For a given subdivision level s, each $u_{ij}$ can take on values in the discrete set $U_s=\{0, 1/(s-1), 2/(s-1), \ldots (s-1)/(s-1)\}$. Thus, the set of colors in a color sail $\mathcal{S}$ can be defined as:

$$C\mathcal{S} = \{u_{i0}v_0 + u_{i1}v_1 + u_{i2}v_2 | u_{ij} \in U_s, \Sigma_j u_{ij}=1\} \quad (1)$$

Figure 5A:
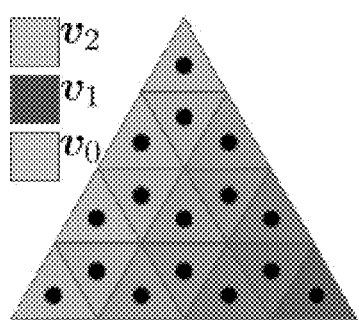
FIG. 5A illustrates an exemplary color sail with barycentric coordinates at face-centroids.
Figure 5B:
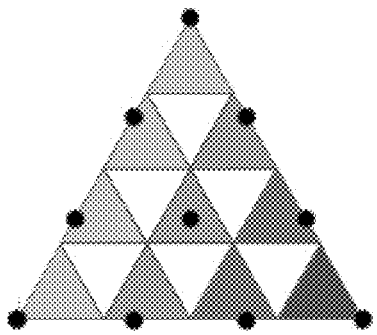
FIG. 5B illustrates an exemplary color sail with interpolation points.
Figure 5C:
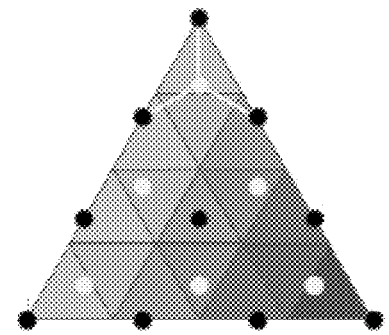
FIG. 5C illustrates an exemplary color sail with barycentric coordinates at face-centroids and at interpolation points.
Figure 5D:
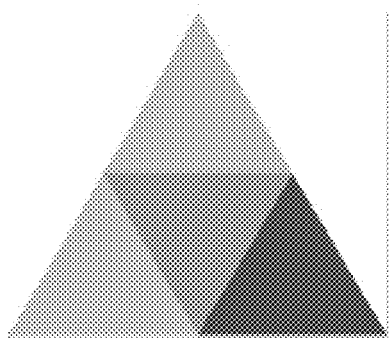
FIGS. 5D to 5F illustrate exemplary color sails with varying patchwork parameter values.
Figure 5E:
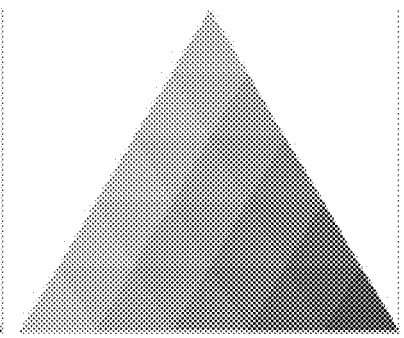
Figure 5F:
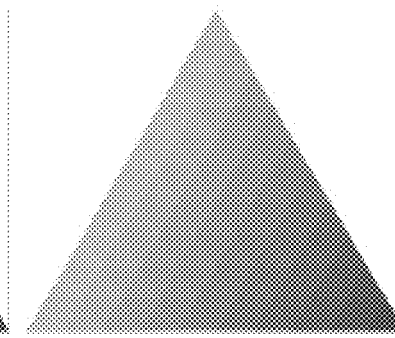

Due to the sum constraint, the size $\|C\mathcal{S}\|$ is exactly $1+2+\ldots+s=s(s+1)/2$. Conveniently, this is equal to the number of upright triangular patches in a triangle subdivided with s segments per side (for example, FIG. 5b), and when rendering the sail, representation module 120 sets the colors of these triangles according to $C\mathcal{S}$. In further cases, these discrete colors need not be rendered as triangular patches, but can be displayed as any suitable arrangment; for example, as an arrangement of square patches in a pyramid as exemplfied in FIG. 21. This results in desirable and correct behavior of including the vertex colors themselves into the set of sail colors (for example, see color interpolation points in FIG. 5b). The unfilled upside-down triangle colors are based on their barycentric coordinates $u_i$ as the average of their neighbors' (FIG. 5C) and we expand $C\mathcal{S}$ to include them. In some cases, other rendering approaches, such as the pyramid exemplified in FIG. 21, may omit including these additional colors. Conceptually this is equivalent to shrinking the triangle vertices by a factor of $(s-1)/(s*\sqrt{3})$, to align with the centroids of the subdivided triangles. Interpolation with barycentric coordinates at face-centroids, as in FIG. 5A, would likely undesirably exclude the three principal vertex colors and pure color gradients between any two of them. Thus, in most cases, the barycentric coordinates for the centroids themselves are generally not used. In FIGS. 5D to 5F, color sail colors for different patchwork settings s are determined using interpolation points in FIGS. 5B and 5C. Interpolation with barycentric coordinates at face-centroids in FIG. 5A would undesirably exclude the three principal vertex colors and pure color gradients between any two of them.

Figure 6A:
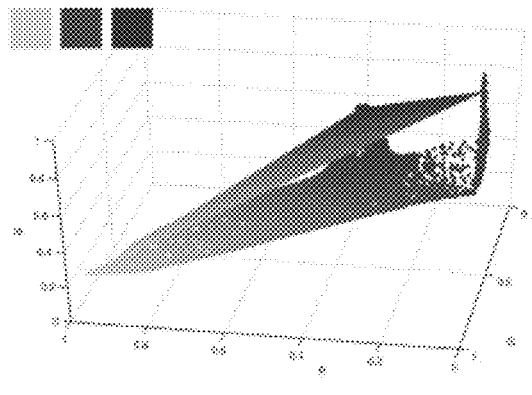
FIG. 6A is an example of linear RGB interpolation blending.
Figure 6B:
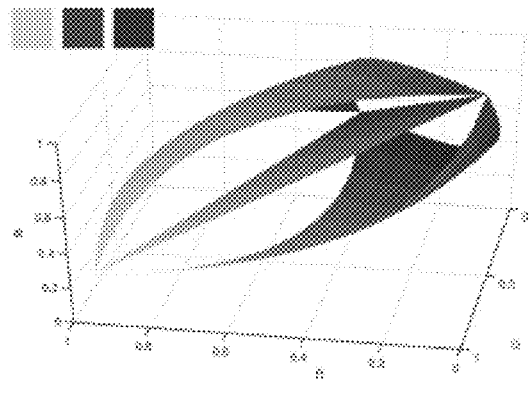
FIG. 6B is an example of smooth non-linear RGB blending.
Figure 6C:
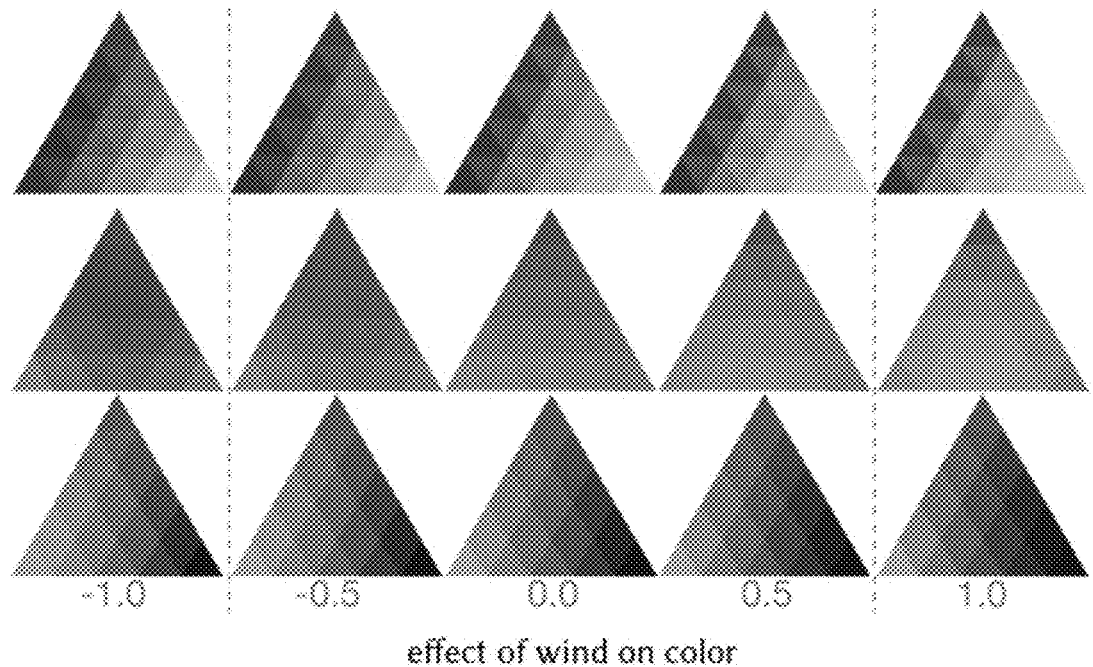
FIG. 6C are examples of the effect of wind color on color sails in accordance with the system of FIG. 1.

In some cases, simple linear interpolation in RGB space can be somewhat limiting because many natural media exhibit non-linear color blending behaviour; see, for example, FIG. 6A, which shows blending of acrylic paints modeled with Kubelka-Munk equation. Rather than modeling a particular medium, the representation module 120 can define color sail wind parameters that allow the color sail to model and represent an array of smooth blending behaviors (see, for example, FIGS. 6B to 6C). Thus, color sails offer a versatile way to model a variety of smooth non-linear blending behaviors.

In a particular embodiment, to model non-linear blending behavior, the representation module 120 uses a cubic Bezier triangle and allows interactive control of its shape using two parameters: barycentric coordinates of a focus point $(p_u, p_v)$ on which the wind is acting and a wind strength parameter w. In an example, the shape of the Bezier triangle can be defined by 10 control points $P=\{p_{ijk}, i+j+k=3\}$ in RGB space (see, for example, FIG. 7). Specifically, a 3D location $C_p$ of a planar color sail point parameterized by barycentric coordinates $(u_0, u_1, 1-u_0-u_1)$ over the triangle vertices (such as the planar interpolated colors in Eq. (1)), can be expressed in terms of $p_{ijk}$ using Bernstein polynomials $B_{ijk}$:

$$c_P(u_0, u_1) = \sum_{i+j+k=3} B_{ijk}(u_0, u_1) p_{ijk} \quad (2)$$

$$B_{ijk}(u_0, u_1) = \frac{3!}{i!j!k!} u_0^i u_1^j (1-u_0-u_1)^k \quad (3)$$

In other cases, quadratic or quartic Bezier triangle formulation can also be used.

To allow simple interactive control, the location of the sail control points $P\mathcal{S}$ can be defined in terms of the focus point $(p_u, p_v)$ and wind w, as well as the vertex colors V:

$$p_{ijk} = V u_{ijk}(p_u, p_v) + f(d_{ijk}^2) \cdot w \vec{n} \quad (4)$$

where the first term is the point location in the triangle plane, and the second term is its displacement in the normal direction.

In this example, each control point $p_{ijk}$ is assigned barycentric coordinates $u_{ijk}$ with respect to the triangle vertices V.

Figure 7:
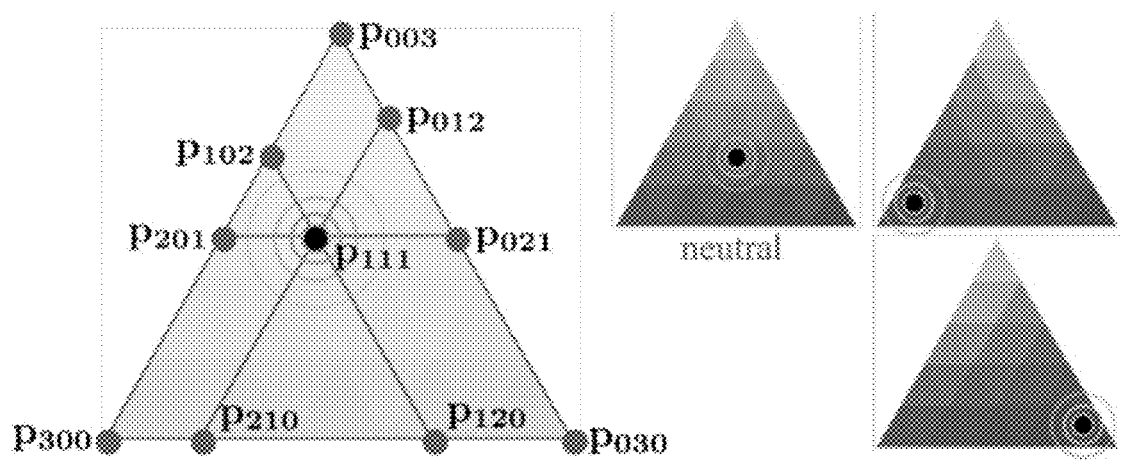
FIG. 7 illustrates a Bezier triangle control point and exemplary effects of varying the position of such control point in accordance with the system of FIG. 1.

$u_{111}=(p_u, p_v, 1-p_u-p_v)$ is defined as the focus point and corner control points $u_{300}, u_{030}, u_{003}$ are set to the vertex colors. The remaining coordinates are likewise naturally expressed in terms of $(p_u, p_v)$, as shown in FIG. 7. Then, all control points $p_{ijk}$ are displaced, except the corner points in the direction $\vec{n}$ normal to the triangle plane. The focus point control point $p_{111}$ is displaced the most, and the displacement of other control points falls off with the distance squared $d_{ijk}^2$ to the central control point.

Thus, the set of non-linearly interpolated colors defined by the color sail $\mathcal{S}$ is:

$$C\mathcal{S}^w=\{c_p(u_{i0},u_{i1})|u_{ij}\in U_s, \Sigma_j u_{ij}\leq 1, P=P\mathcal{S}\} \quad (5)$$

where $u_{i0}, u_{i1}$ are the same as in Eq. (1), and the 10 control points P interpolated by $C_p$ are expressed in terms of the color sail parameters. These choices make it possible to express $C\mathcal{S}^w$ in matrix form with clean derivatives of the interpolated colors with respect to the color sail parameters.

In further embodiments, other non-linear blending methods for interpolation between three points may be used. For example, in some cases it may not be necessary to use Bernstein polynomials, as in Bezier triangle, but instead use other basis functions. In some cases, more or less control points may be used instead of only having the seven control points illustrated in FIG. 7 (points: p102, p012, p201, p021, p120, and p210). In some cases, the wind and focus point parameters could have a different effect on the position of the intermediate points (not the vertices) in RGB space. In some cases, modification of actual middle control points could even be learned from data and the system 100 can adjust the middle control points based on the wind parameter; for example, the wind parameter could result in modifications to a level of contrast, a feeling of the image (for example "more cheerful"), textural appearance (for example, "more like watercolor"), or the like. In a particular case, a cubic Bezier triangle can be used such that the user can control all three control points located on the edges of the triangle, i.e. 3 focus points, instead of the single middle focal point.

In a continuous setting, the color sail can be interpreted as a three-dimensional color gradient. The wind w parameter allows interpolated colors to deviate smoothly from planar blending. Bringing the focus point close to a vertex biases the blending interpolation toward that color. Advantageously, this can allow the user to narrow in on fine variations of a particular color (as exemplary illustrated in FIG. 7). Unlike other approaches using 3D color manifold representations, the approach of system 100 is sparse and allows interactive control.

Figure 21:
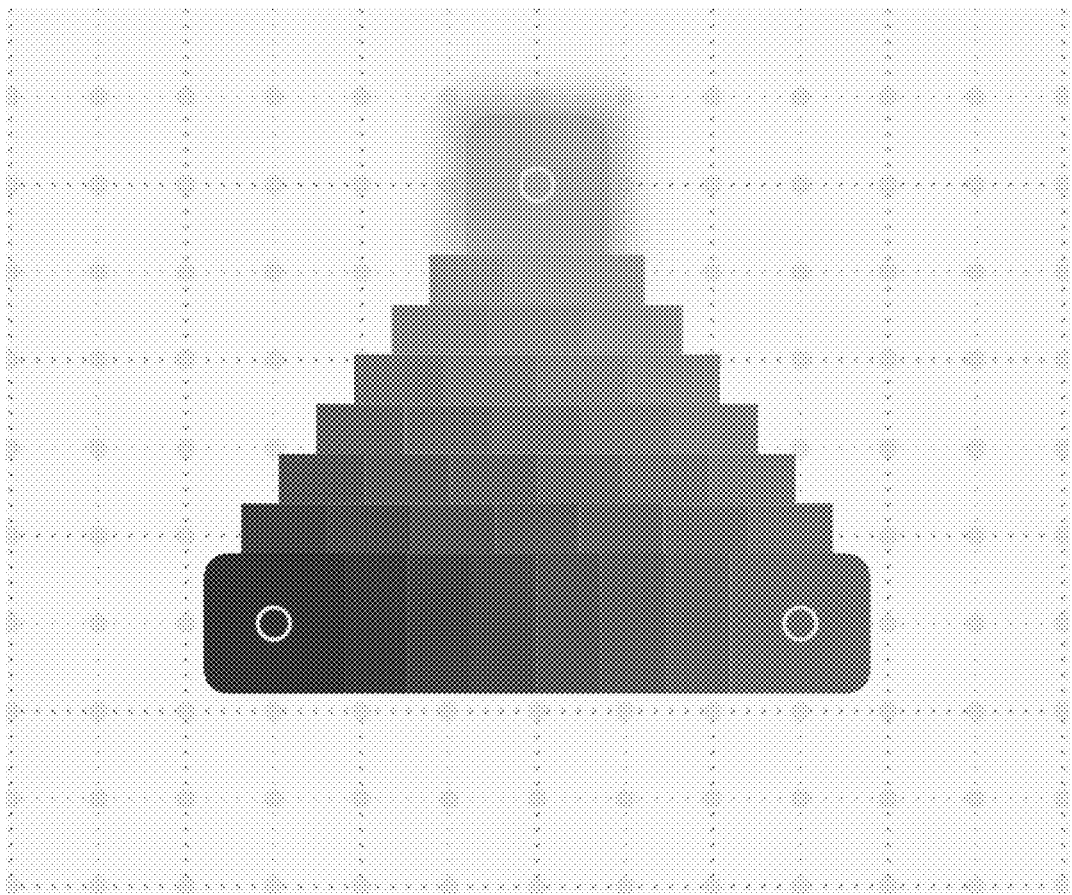
FIG. 21 is an example of a pyramid arrangement of colors.

In some cases, the layout of the color sail on the user's screen does not have to be fixed; i.e., the user can deform the triangle in any way for easier exploration and color picking. Additionally, it is contemplated that the color sail can have any suitable shape; for example having rounded sides. In further cases, other types of arrangements for the sail colors can be used; for example, as shown in FIG. 21.

Advantageously, the color sail has a fixed number of parameters, unlike other approaches to interactive continuous gamuts, making it more amenable to machine learning approaches. As well, the discrete-continuous setting gives color sail an additional degree of flexibility, varying the number of represented colors with no change to the required storage.

Figures 8A, 8B, 8C:
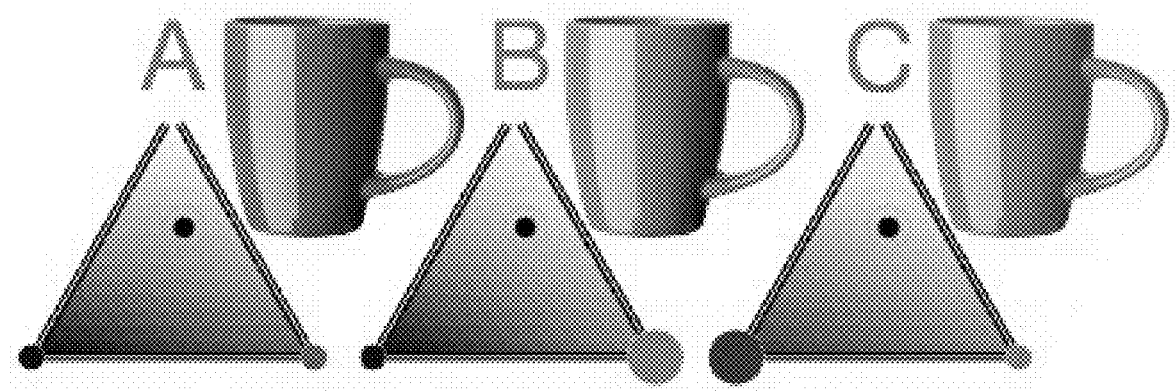
FIGS. 8A to 8C illustrate multiple examples of mapping from an image to a color sail and varying base colors in accordance with the system of FIG. 1.
Figures 8D, 8E:
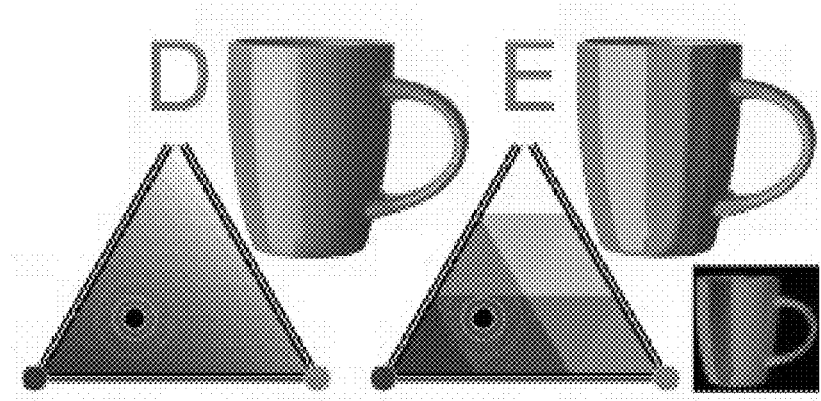
FIG. 8D illustrates an example of mapping from an image to a color sail and varying focal point and wind parameter in accordance with the system of FIG. 1.
FIG. 8E illustrates an example of mapping from an image to a color sail and varying discreteness with a patchwork parameter in accordance with the system of FIG. 1.

The interactive color sail described herein can be a useful for representing color gamuts independently of any image, but can be especially useful when associated (linked) to an image. The representation module 120 can be used to model a color distribution of an image, generally in a piecewise manner, using one or more of color sails. In an example, a single color manifold is not fit to the entire image, but rather a set of separate smooth manifold "pieces," the color sails, are fit to the image. Using the present embodiments, it is possible to change colors of an image using a mapping from an image to its associated one or more color sails, allowing for color sail based recoloring. Advantageously, this allows interactive exploration of an image's colors by changing parameters of its color sails; for example, changing vertex colors (for example, as illustrated in FIGS. 8A to 8C), changing focus point and/or wind blending behaviour (for example, as illustrated in FIG. 8D), and changing patchwork level to change discreteness (for example, as illustrated in FIG. 8E). In this disclosure, the one or more color sails and the mapping from the image to its color sails is referred to as a color sail rig. The color sail rig can be generated by the system 100 automatically.

The present embodiments provide an example solution to the technical problem of rigging an image with sails by, for example, separating an image into regions to be modeled by color sails and fitting a color sail to every region.

Figure 9:
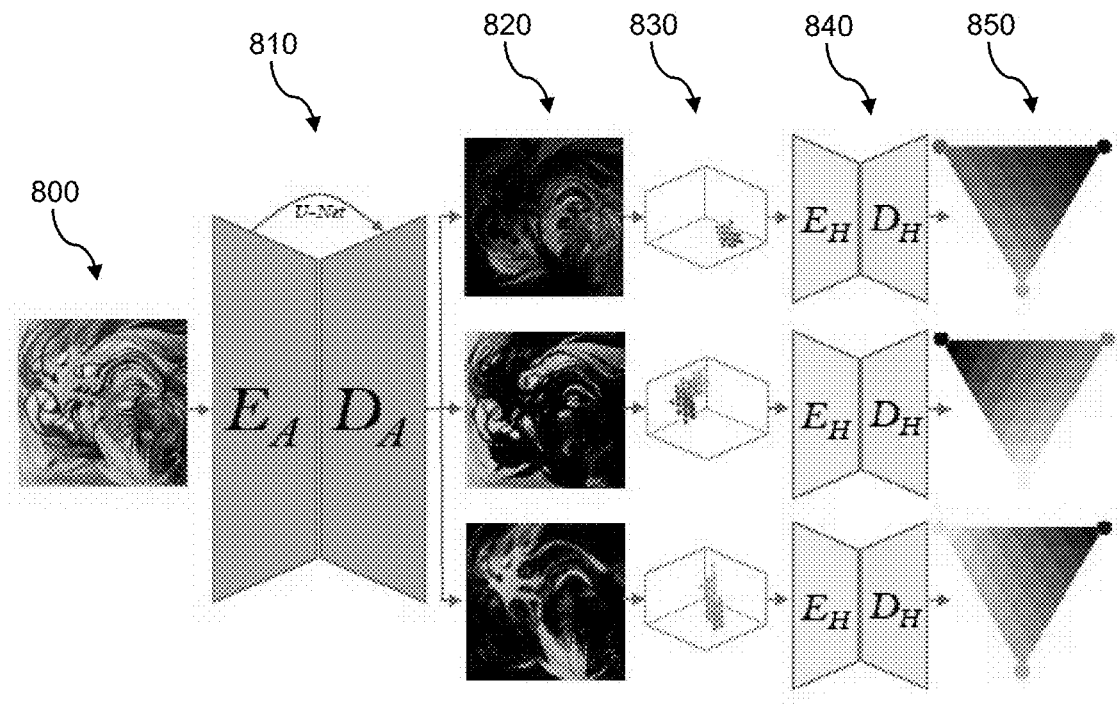
FIG. 9 illustrates an exemplary architecture to produce alpha masks, which are used to gate histograms that are passed to a neural network to produce a color sail per alpha mask in accordance with the system of FIG. 1.

FIG. 9 illustrates an example of a model architecture according to system 100. In this example, a second neural network comprises a U-Net architecture to produce alpha masks, which are used to gate histograms that are used to produce a color sail per alpha mask. As described herein, given an image I, a plurality of alpha masks are produced ("$N_a$" number of alpha masks). For each alpha mask, the corresponding colors are encoded into a histogram and output a single color sail. A machine learning model is trained by the mapping module 122 to be able to predict alpha masks such that the color distribution in the region under the mask can be explained using a single color sail. In an embodiment, while the mapping module 122 runs the machine learning model end-to-end, palette prediction can be trained separately, at first, with a first neural network (referred to as a palette network). This can be beneficial because: (1) color sail fitting is an independent problem, a solution to which may be useful outside of the context of image segmentation, (2) a pre-trained palette graph allows the second neural network (referred to as an alpha network) to focus on learning segmentation without conflating its search direction with a separate task.

In this case, the U-net architecture is used; however, it is contemplated that any suitable architecture may be used. The U-net architecture is an encoder-decoder convolutional neural network architecture that has additional connections between encoder and decoder layers of the same resolution. This allows the decoder to take in high-frequency details from the encoder, generally resulting in crisper final output than the traditional encoder-decoder architecture that loses high-frequency detail during the encoding process and lacks the information to recover this detail during decoding.

In this embodiment, convolutional neural networks are a particularly good fit for the second neural network where it is a network that uses an encoder-decoder architecture. In further cases, Recurrent Neural Networks (RNNs) can be used for the second neural network, in particular when coupled with an attention module. In that scenario, the second neural network would take as input the region of interest (a bounding box), and successively predict and modify a set of alpha masks and color sails by moving its attention to different parts of the image. In further cases, an RNN could also be used without an attention module, where the network would predict one alpha mask and color sail at a time, and then take in the part of the image that has not yet been selected and continue fitting color sails until the image is covered. In other cases, an artificial neural network can take user input (for example, click, scribble or rough selection) for the region of interest and generate a single soft mask for the user-suggested region such that the region is well-modeled by a single color sail. In this case, the generated color sail rig is local and is specific to what the user is interested in modifying.

In this embodiment, alpha masks are used to select regions of the image well approximated by a single color sail. The alpha mask is a grayscale image, where each pixel's value encodes how much the corresponding color sail contributes to its actual color. The sum of all alpha masks for each pixel is 1, so it can provide a way to softly split up the image across the plurality of color sails. In further embodiments, other types of masking may be used.

In this embodiment, histograms are used to represent color distribution in an image. This representation, when normalized, can be independent of image size (or the size of the alpha mask) and so they allow the palette network to fit color sails to a variety of images, patches, and image regions.

For any input set of colors Y of an image, a goal of the mapping module 122 is to use the first neural network to fit the parameters of a color sail $\mathcal{S}$ in order to minimize some error metric $L(Y, C\mathcal{S}^w)$ between the input colors and the set of color sail colors $C\mathcal{S}^w$. In particular, a goal is to find 3 color vertices $v_0$; $v_1$; $v_2$, patchwork s, pressure/focal point $(p_u, p_v)$ and wind w to best approximate Y. In a particular case, the mapping module 122 trains the first neural network; particularly where there is a differentiability requirement for it to function inside an alpha neural network, as described.

In some cases, it is not required to work with the image input directly as no spatial knowledge is necessary. In these cases, a goal of the mapping module 122 is to approximate a set of colors as closely as possible by a deformed planar patch of RGB space. The present approach can be able to approximate colors in regions of varying size and alpha weights assigned to pixels during region learning. Accordingly, in some cases, the input color distribution can be represented as a histogram $H_Y$ of n×n×n bins in RGB, where the count of a pixel's color can be weighted by its alpha and the bin values are normalized. In this case, the input size is always $n^3$, regardless of the region size (in an example, n=10).

Figure 10:
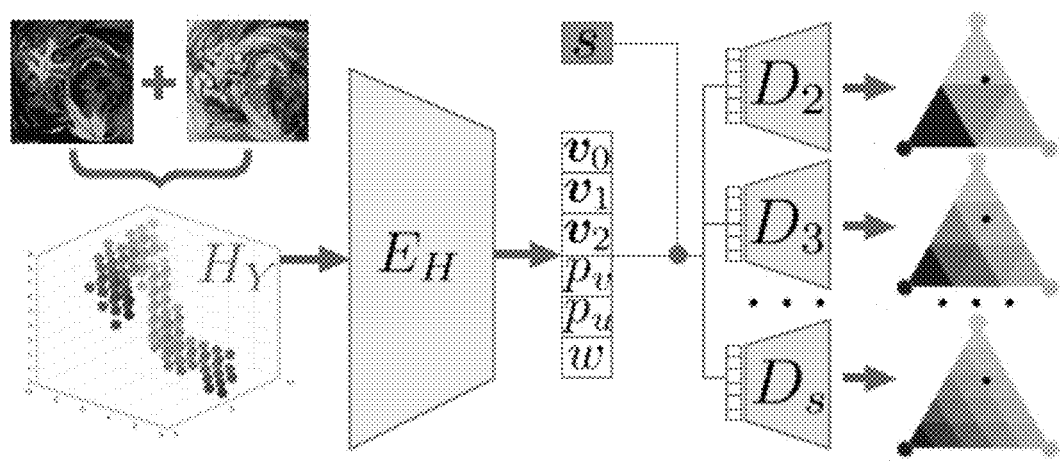
FIG. 10 illustrates an exemplary architecture for using a neural network to encode color sail parameters and then decode into color sail colors for a particular patchwork value in accordance with the system of FIG. 1.

In some embodiments, the first neural network has an encoder-decoder structure, with the encoder $E_H$ mapping the input histogram $H_Y$ to the parameters of a color sail $\mathcal{S}$ (as exemplified in FIG. 10). In FIG. 10, the first neural network encodes a normalized histogram input as the color sail parameters, which can be decoded into the full set of color sail colors $C\mathcal{S}^w$ using a deterministic decoder, constructed for a particular patchwork value s. In this case, the first neural network's decoder can be fully deterministic, as it applies the formula for computing the interpolated colors $C\mathcal{S}^w$ based on the color sail parameters (Eq. 5). In an embodiment, the integer patchwork parameter s is not encoded, which controls the number of output interpolated colors, to reduce complexity. Instead, s can be an external input, which acts as a switch, determining which decoder $D_s$ is currently active. This can be a powerful parameter both during training of the model and at run time. The present inventors have determined through experimentation that a 4-layer fully connected neural network performs well on this problem, and that the determining factors of success are the choice of the loss function and data selection.

Although, in the present embodiment, the input to the first neural network is a histogram, it may be, in some cases, more natural to define error metrics on the pixel colors $y_i$ in the input image Y. First, a representative palette must contain all the colors in Y. This criterion can be tracked with two metrics. First, a greedy $L_2$ RGB reconstruction loss can be determined:

$$E_{L2}(Y, C_S^w) = \frac{1}{\|Y\|} \sum_{y_i \in Y} \min_{c_j \in C_S^w} \|y_i - c_j\|_2 \quad (6)$$

where Y is an input image, $C\mathcal{S}$ are colors represented by color sail $\mathcal{S}$ with wind (as in Eq. (5)), $y_i$ is a color of ith pixel in Y, and $c_j$ is any color in $C\mathcal{S}^w$.

This above metric can track an average error for a pixel in the image if it were modeled using the best matching interpolated color in $C\mathcal{S}^w$. However, L2 loss may not necessarily correlate well with perceptual metrics due to averaging effects. Second, the fraction of the patch pixels that are well-approximated by the color sail colors can be tracked:

$$E_\%(Y, C_S^w) = \frac{1}{\|Y\|} \sum_{y_i \in Y} \mathbb{1}\left[\min_{c_j \in C_S^w} \|\text{lab}(y_i) - \text{lab}(c_j)\| < \delta\right] \quad (7)$$

where ∥ is 1 if the condition inside the brackets evaluates to true and 0 otherwise. Note that this equation is generally only used for evaluation, and not during training.

Essentially, the mapping module 122 determines the fraction of pixels that have a "good enough" approximation using the best matching color in the sail color. It is possible to define a consistent "barely noticeable" distance in a color space (for example, CieLAB space), where distances are more perceptually uniform (for example, δ=10).

In most cases, a good color representation should not only be able to reconstruct the image colors of an image, but also contain few errorneous or irrelevant colors. For instance, a red patch Y will have a zero $E_{L2}$ and $E_\%$ losses if one of the vertex colors $v_i$ is red, even if the other vertices have colors that bear no connection to Y. To measure how relevant a palette color is to an image, a measure is used that encourages the distribution of colors in the output color sail $\mathcal{S}$ to resemble the color distribution of Y, namely Kullback-Leibler divergence:

$$E_{KL} = KL(H_S \| H_Y) = -\sum_{b \in H_S} H_S(b) \log \frac{H_Y(b)}{H_S(b)} \quad (8)$$

where $H\mathcal{S}$ is the normalized histogram computed over the colors $C\mathcal{S}^w$ in the predicted color sail $\mathcal{S}$ (with equal count assigned to every color), $H_Y$ is the histogram of colors in the input image Y, b is a bin in the histogram $H\mathcal{S}$, and $H\mathcal{S}(b)$ is a normalized count of that histogram bin.

In some cases, the asymmetric nature of the above measure is a good fit for the question about palette colors in particular, but a palette may need not contain colors in the same proportion as the image itself. To mediate this discrepancy, $H_Y(b)$ for Eq. (8) can be determined by first computing small patch histograms, then taking the max of every bin across patches, and normalizing. This encourages every significant color in Y to attain a maximal value in the histogram.

Color sails, as described herein, generally represent color distributions of coherent image regions, where a single low-order manifold in RGB space provides enough representative power. For this reason, in some cases, color sails may not be fit to entire images. Instead, in a particular case, input images Y in the training and testing data can be random image patches. This training and testing data provides an approximation for coherent regions, the colors of which are to be modelled. In exemplary cases, an aim is to support visual creative tasks, such as digital painting, graphic design, and visualization, and the train and test image sets are selected accordingly.

While $E_{o_{\%}}$ is a loss that can be optimized, it may not be amenable to gradient descent based optimization techniques. Therefore, for the above loss function $\mathcal{S}(Y, C\mathcal{S}^w)$, the mapping module 122 can use a weighted sum of $E_{L2}$ and $E_{KL}$. Thus, the mapping module 122 can train the weights of the encoder $E_H$ using stochastic gradient descent with, for example, an Adam optimizer (for example, with a learning rate of $10^{-3}$) by back propagation through the entire first neural network, including the deterministic palette decoder $D_s$, which itself generally has no trainable weights.

Figure 11:
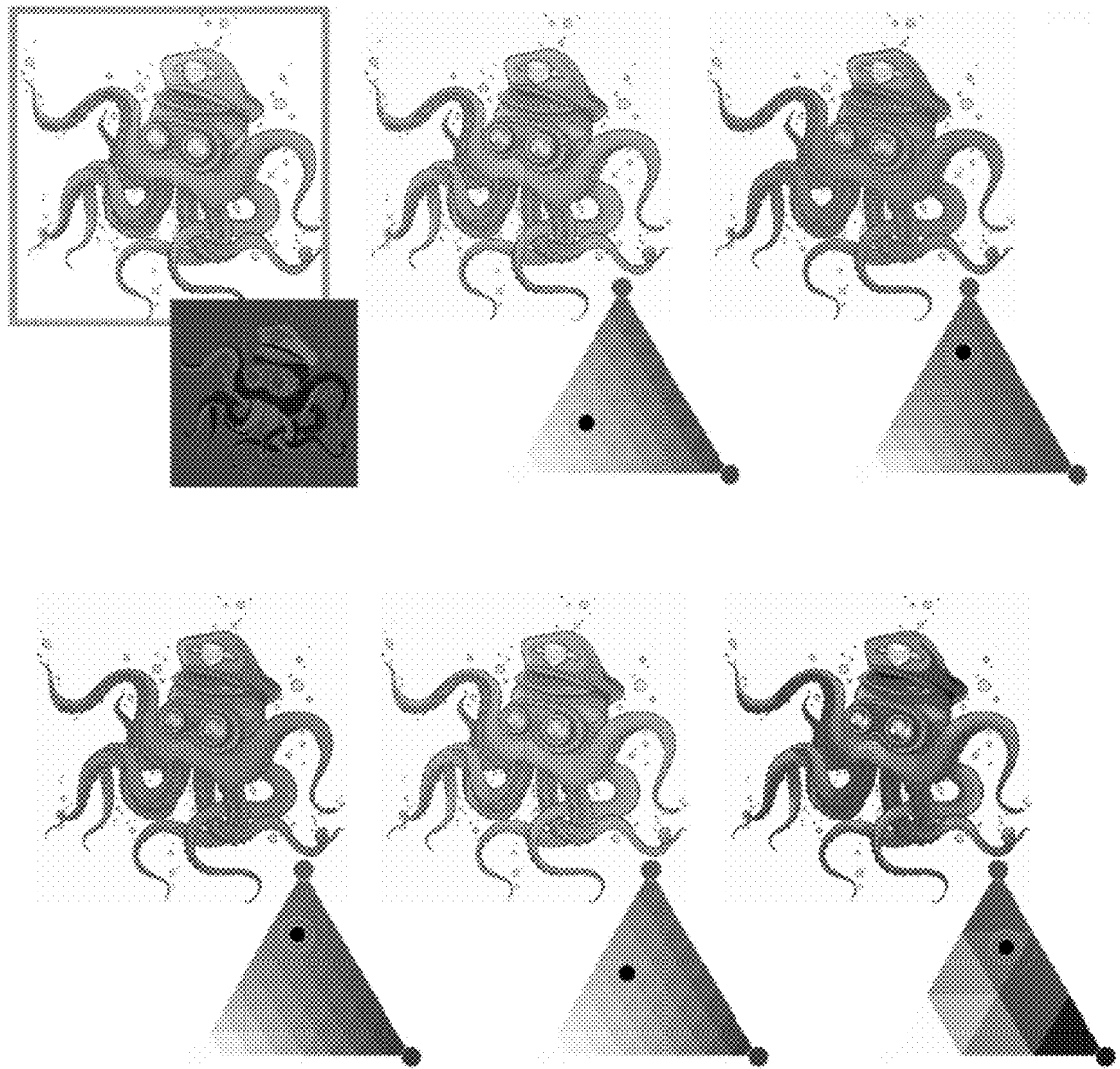
FIG. 11 illustrates multiple examples of modifying a color scheme of a reconstructed image using the system of FIG. 1.

After the first neural network has been trained, the mapping module 122 can use the encoder portion $E_H$ at run time. For any design Y, the mapping module 122 can determine a histogram H and encode it using $E_H$ into the parameters of a color sail $\mathcal{S}$. Once the color sail parameters have been computed by $E_H$ (in most cases, forward pass in the neural network is very fast), the mapping module 122 can determine all the color sail colors $C\mathcal{S}$ and find the greedy best match for every pixel in the image. In some cases, this can be used to interactively edit image colors by manipulating the color sail with the user interface 106 to quickly provide updates to the rendering pipeline during user interaction. As the user is manipulating the color sail parameters, the decoder $D_s$ can render the updated sail, and every linked pixel is recolored with the linked color. Manipulation of a single color sail can provide a wide range of color editing effects, while respecting color relationships in the image. For example, by changing vertex colors, the shape of the gradient in RGB space, and the discreteness level of the sail, a user can explore many possibilities for the design (see, for example, FIG. 11). In some cases, a single color sail can lack representative power to model many distinctly colored regions of the image. In FIG. 11, shown are exemplary results of editing designs with a single automatically generated color sail.

In an embodiment, for an input image I, alpha masks and a color sail for each alpha mask can be predicted by the mapping module 122 such that approximately all colors in image I are well represented in the complete color sail rig. In most cases, the alpha masks can be learned without any explicit supervision. In particular, the trained first neural network can be leveraged and an image reconstruction loss can be optimized to learn meaningful alpha masks. Optimizing for image reconstruction, given a constant palette network, can force the second neural network to output masks that correspond to image regions that can be well explained by a distribution of colors in a single color sail.

In this way, the second neural network is trained to automatically split an image into soft regions (alpha masks), where each soft region is associated with its own color sail predicted by the second neural network. Thus, changing a color sail only affects its associated soft region of the image.

As illustrated in FIG. 9, the received image 800, the second neural network 810, the alpha mask(s) 820, the histogram(s) 830, the first neural network(s) 840, and the color sail(s) 850 are shown. The second neural network 810 splits the image 800 into soft masks 820. Each mask 820 is used to weigh the color histogram 830 of the image; for example, in FIG. 9 the first alpha mask mostly selects the reds and downweighs the counts of other colors. Then each of these histograms 830 (one for each alpha mask) is encoded and decoded using the first neural network 840 into the respective color sail 850. The total combined colors in all of these color sails 850 represent all the colors in the received image 800. The second neural network 810 is trained such that color sails 850 can be fit to the regions it selects to best reconstruct the received image 800.

In a particular case, an encoder-decoder neural network architecture can be used for the second neural network. In some cases, skip connections from encoder layers to decoder layers can be added, akin to a U-Net architecture. The mapping module 122 uses the second neural network (as exemplified in FIG. 9) by taking as input an RGB image and outputting $N_a$ channels at the input resolution. In some cases, the mapping module 122 squashes these values to produce the final alpha masks by applying a softmax function across channels at every pixel. Histograms of RGB colors, as above, per alpha mask are generated by the mapping module 122 by adding soft votes (i.e., the alpha values) into corresponding bins. Each histogram can then be passed through the second neural network to produce parameters of a single color sail, which can then be decoded into its full set of colors by the mapping module 124.

The second neural network can be trained to be able to reconstruct the original image using the produced alphas and color sails. The $i^{th}$ alpha mask is denoted as $a_i$ and the corresponding set of color sail colors as $C_{a_i}$ (as determined using Eq. (5)). Using these, the pixel value at location x, y of the reconstructed image $I_R$ can be determined by the mapping module 122 as:

$$I_R(x, y) = \sum_{1 \le i \le N_\alpha} \alpha_i \mathop{\mathrm{argmin}}_{c_j \in C_{\alpha_i}} \|I(x, y) - c_j\|_2 \tag{9}$$

The reconstruction loss is simply the mean L2 loss between the pixels of I and $I_R$. In some cases, to promote spatial regularization in the alphas, total variation regularization on the predicted alphas is added to the optimization objective (for example, with a weight of $10^{-3}$). In addition, in some cases, to encourage the network to select binary masks, rather than blend colors, a temperature parameter τ is introduced in the softmax:

$$\mathrm{softmax}(z, \tau)_j = \frac{e^{z_j/\tau}}{\sum_{k=1}^{K} e^{z_k/\tau}} \tag{10}$$

Lower values of τ make the predictions more confident, and empirically, the present inventors have found τ=⅓ provides a good trade-off between allowing blending and preferring binary alphas. To train the model, in some cases, the mapping module 122 can use the Adam optimizer with a learning rate of, for example, $10^{-3}$. In some cases, while training the second neural network, the first neural network can be initialized from a pre-trained checkpoint and its weights can be kept frozen.

In some cases, different images can be best represented with different numbers of color sails. In this way, the mapping module 122 can train multiple models for producing different number of alphas $N_a$ per image (for example, $N_a=2,3,4,5$). At run time, a model is selected for an image I using the following equation:

$$N_a(I) = \underset{N_a}{\operatorname{argmin}}(L_{N_a}(I) + 100N_a) \quad (11)$$

where $L_{N_a}(I)$ is the weighted sum of our reconstruction and regularization losses.

The present inventors arrived at this trade off after inspecting results on a validation dataset with the aim of producing the minimum number of alphas while making sure that the color sail rig represents the image sufficiently.

Thus, in this embodiment, the system 100 determines alpha masks, color sails, and a pixel to color sail mapping. The user can now edit or amend one of several linked color sails to recolor distinct regions of the image. The reconstructed pixel is computed using Eq. (9). This allows fast exploration of widely different color combination for various regions of the image.

Generally, the second neural network described above can split an entire image into a set of alpha masks. In other cases, a user-guided image matting approach is described. In these cases, the system 100 can receive user input indicating which region of interest of an image the user desires to recolor. In these cases, a single alpha mask (with values of pixels <=1) can be outputted containing the user-indicated region of interest as well as the corresponding color sail fit to that region using the first neural network. The mapping from the color sail to pixels in the mask can be accomplished as described herein. In an example of these cases, the user can use the color sail to recolor a single region of interest.

For the user-guided image matting approach, another neural network (a third neural network) can be used. In some cases, this third neural network can have the same architecture as the second neural network, outputting two alpha masks: one mask for the user provided region of interest, and the second mask for the background. In some cases, the two masks can sum up to 1 at every pixel. In some cases, the input to the third neural network can be the input image and user guidance as a separate channel. In some cases, the third neural network can be trained using labeled data or in an unsupervised fashion. In an example, in order to collect labeled data, a user interface can be used such that the user can upload an image and manually draw the region of interest. The first neural network could then fit a color sail to the user-provided region of interest and allow interactive recoloring of that region. Thus, there would be significant value to users even in this manual interface. The third neural network can be trained to output masks similar to user-provided alpha masks, with user guidance generated for the data automatically (for example, as a click or set of clicks in the interior of the user-provided region). The loss component would incorporate both reconstruction loss, as described herein, in the alpha region, and intersection over union (IOU) with the user-provided mask.

The third neural network can also be trained in an unsupervised fashion using, for example, adversarial loss. For each unlabeled image, simulated user input can be generated by sampling a point v in the image such that it is not near any edge (for example, an edge map could be obtained using any number of existing algorithms). The third neural network can then be trained using gradient descent on batches of this data to minimize a loss comprised of three terms, $E_{L2}$, $E_A$, $E_{GAN}$. The first term $E_{L2}$ is pixel-wise Least Square Errors (L2) loss between the original image I and the image reconstructed by substituting colors of pixels in the mask with best matching colors in the predicted color sail (for example, similar to Eq. 9). The second term $E_A$ is the area loss. Starting from the sampled point p in a training image, a flood fill algorithm could be run to define a region R of similar colors around the point. Because color sails can definitely model a single color well, R can serve as an approximate lower bound for the area of the predicted mask. R can be represented as a one channel image with everything in R marked as 1. This allows us to formulate the first, area-based, unsupervised loss component: $E_A = \Sigma_{x,y} R(x, y)(R(x, y) - M(x, y))$; where M is the predicted mask. Thus, all pixels that are in R, but not in M are penalized. However, if M extends beyond R (which is a lower bound), then no error is incurred.

The final component of the loss, $E_{GAN}$, is adversarial loss, such as the loss employed in a variety of General Adversarial Networks. For example, it can be the loss of the Wasserstein GAN. Adversarial losses generally require training a discriminator network and evaluating it on the output of the generator network (the third neural network in the present case). In a typical GAN setup, the main generator network typically outputs images and the discriminator network tries to distinguish real images from images generated by the generator network. Thus, the generator network is competing with the discriminator network during training. Because in our case the third neural network does not directly output images, the setup is slightly different. First the generated mask M and the predicted color sail are used to randomly recolor the image by perturbing one or several of the predicted color sail vertex colors. Next, the discriminator is trained to distinguish edited images from original images (reconstructed images without any color sail editing). When adversarial loss is applied in this fashion, the third neural network learns to produce a mask M such that when a color sail is fit to this mask and used for editing, the results can advantageously look natural. In some cases, one of the standard GAN losses, termed $E_{GAN}$, can be regularized with weighted addition of $E_{L2}$, $E_A$.

Advantageously, the single mask generated by the third network can be used interactively to allow the user to recolor the region of interest using a single color sail fit to that region using the first neural network. In this way, the user-guided image matting approach can be similar to the full color sail rig generated using a combination of the first and second neural network, described herein, but also includes user guidance to select the recolored image.

In an exemplary implementation of the system 100, the present inventors collected images in the following broad set of categories to train the machine learning models (referred to as training dataset): 1) 600 images of art, which includes painting and illustration, 2) 600 pieces of graphic design, which includes more targeted use cases, such as poster, logo and user interface design, and 3) 300 pieces of visualizations, where a primary goal is to graphically show information. In addition, a larger uncategorized dataset of 3000 images was also collected (referred to as GAP dataset).

Randomly selected test data was withheld from different categories to create a test set. The test set is referred to as the target test set. In addition, a larger dirty test set was withheld from the uncategorized images. Small validation sets for all categories were also withheld to monitor and tune training. The remaining categorized training data is referred to as the target training set and remaining uncategorized images as the dirty training set.

Because the uncategorized images were found to be less colorful than the other images, the data associated with such images was weighed in a way to make its colorfulness distribution equal to that of the target training set when selecting batches during stochastic gradient descent. In this case, each batch of data for both machine learning models consists of equal number of categorized and uncategorized samples.

Figure 12A:
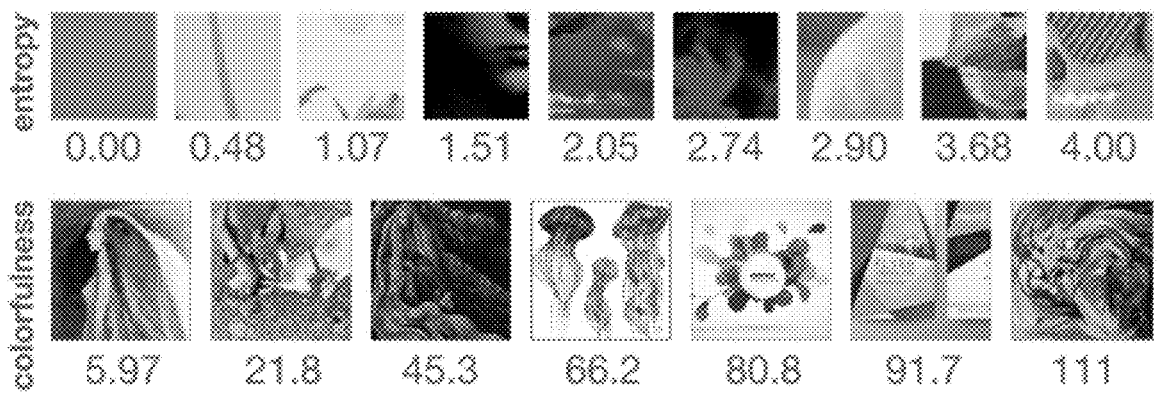
FIG. 12A illustrates examples of patch histogram entropy values and image colorfulness values for experimental datasets.
Figure 12B:
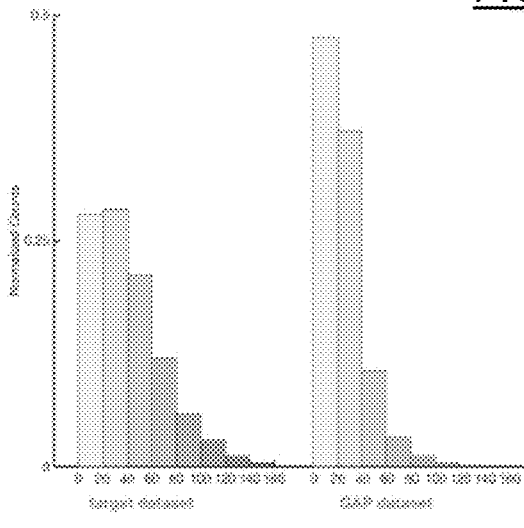
FIG. 12B is a bar graph showing colorfulness values for experimental datasets.
Figure 12C:
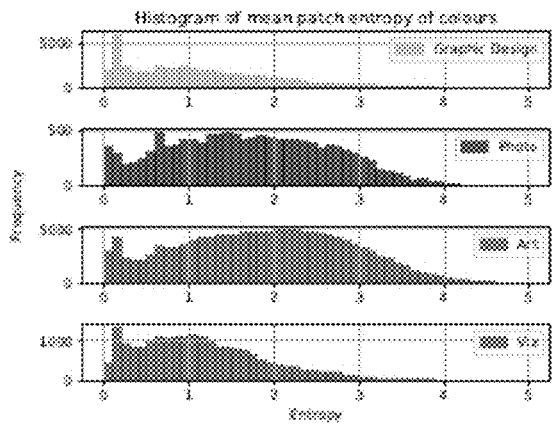
FIG. 12C are graphs showing patch entropy values for experimental datasets.

Initially, the present inventors tried palette learning on random 32×32 patches extracted from images rescaled to 512×512 in the combined target and dirty training sets but determined that random patches mostly contain muted solid colors from background and low-frequency areas of the image; making it not only hard to train, but to evaluate performance on such data. To overcome this, it was observed that histogram entropy computed over the patch colors is a rough indicator of color complexity present in the patch (FIG. 12A). The first row of FIG. 12A shows sample entropy and the second row shows colorfulness of image patches and images. By examining patches of various entropy levels, "easy" patches with entropy <1.5 were designated as easy, patches with entropy over 3 as "hard", and the rest as "medium". The tests were split accordingly to better evaluate performance. See FIGS. 12A and 12B for patch entropy distributions in the datasets. As shown in FIG. 12B, colorfulness can be used to weigh unlabeled datasets to better approximate target data distribution, and entropy to designate various levels of difficulty for palette learning test sets for the first neural network.

In order to encourage more difficult patches to occur in the training set during target patch selection, the random patch selector was center biased, as the central area of the image is more likely to contain the more detailed main subject. In addition, patches of random size were generated and then the distribution was rescaled. This generally makes the training set of the first neural network more analogous to the region-based input seen during training of the second neural network.

In this example, the first neural network was trained and tested on randomly selected image patches, with datasets selected to match a goal of accurately approximating color distributions in regions of various categories of art and design. For palette regularization, a sum of $E_{L2}$ reconstruction loss and $E_{KL}$ divergence regularization with a weight of 0.0001 was determined. It was empirically determined that patch-based histogram computation within a patch image for $E_{KL}$ computation produced slightly better results visually, but was not necessarily reflected in convergence graphs. This $E_{KL}$ regularization improves the $E_{KL}$ metric (as shown in FIG. 13B) and encourages the encoded color sails to contain fewer unrelated colors (as shown in FIG. 13B), while having no adverse effect on the reconstruction loss convergence (as shown in FIG. 13A). In some cases, this regularization is key to both mapping estimation for color sail editing and region learning, where the greedy reconstruction in Eq. (9) could make use of unrelated colors in un-regularized palettes, derailing region learning. FIGS. 13A to 13C illustrate results from "noreg"—unregularized learning, "reg"—regularized learning with histogram in $E_{KL}$ computed over the entire patch, and "patchreg"—regularization with histogram in $E_{KL}$ computed over even smaller sub-patches.

Figure 14A:
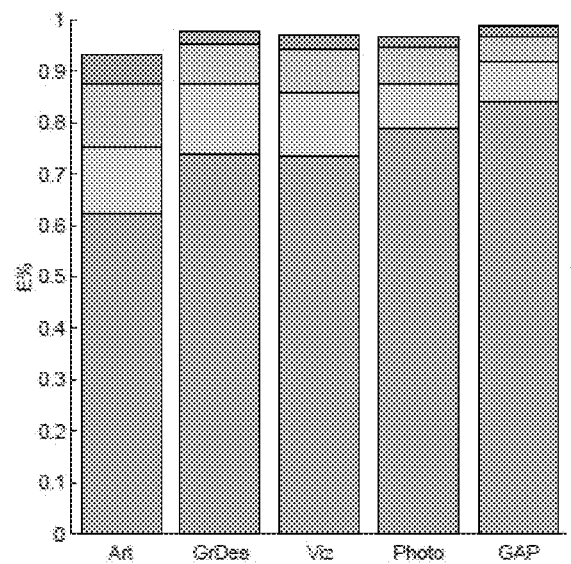
FIG. 14A illustrates percentile results for experimental datasets of the fraction of input patch pixels that are well-approximated by the color sail colors on various art domains.
Figure 14B:
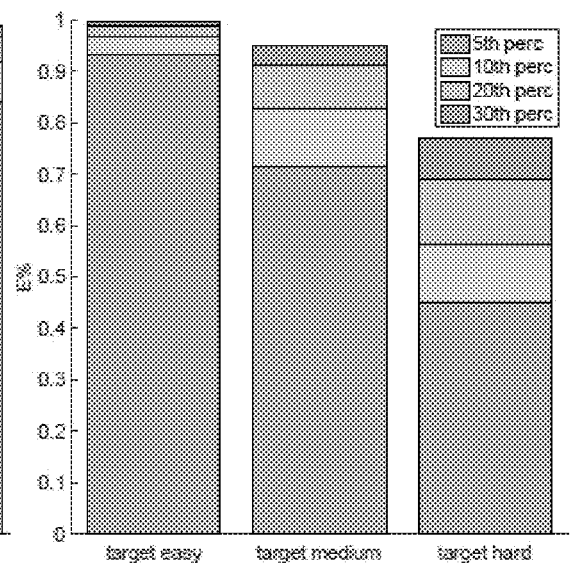
FIG. 14B illustrates percentile results for experimental datasets of the fraction of input patch pixels that are well-approximated by the color sail colors on hardness levels.
Figure 14C:
FIG. 14C are exemplary visualizations of "barely noticeability" for experimental datasets.
Figure 14D:
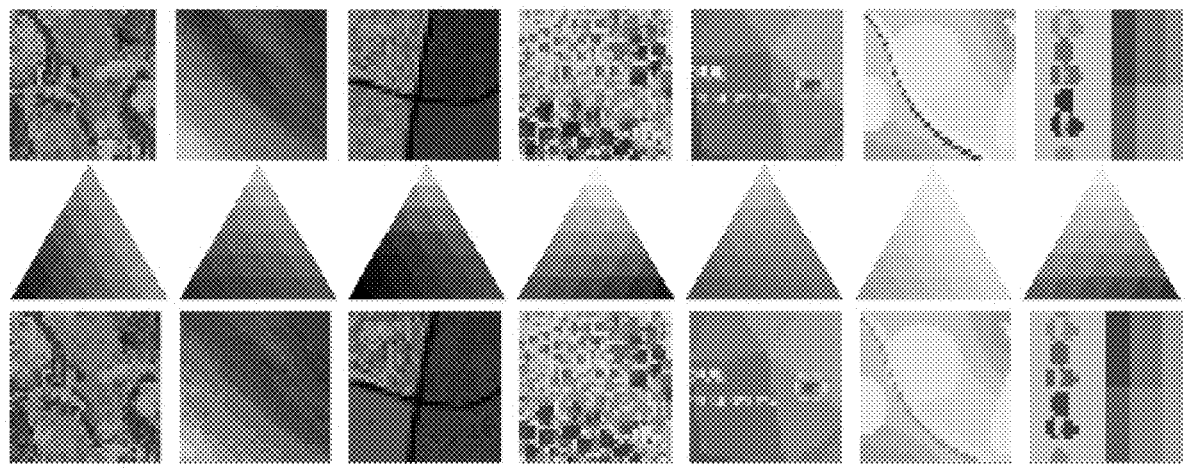
FIG. 14D illustrates example results from difficult input patches, each example showing an input patch, an encoded palette, and an image reconstructed with one best matching palette color.

The first neural network was empirically found to achieve excellent performance on the target $E_{\%}$ loss (Eq. (7)), with only 5% of easy patches having $E_{\%}$ less than 0.93; i.e., in 95% of easy patches at least 93% of pixels are reconstructed to be barely noticeable from the original. The performance on medium patches is likewise good, with only 10% of test patches having fewer than 83% of pixels reconstructed sufficiently well. See FIGS. 14A to 14D for percentile results on various art domains, hardness levels, as well as for visualizations of "barely noticeability" and sample reconstructions. FIG. 14A illustrates $E_{\%}$ from Eq. (7) plotted for art domains and FIG. 14B illustrates $E_{\%}$ from Eq. (7) plotted for patch hardness levels based on entropy. Maximal barely noticeable difference in $E_{\%}$ is visualized in FIG. 14C. FIG. 14D illustrates results from particularly difficult patches, for each showing an input patch, an encoded palette, and an image reconstructed with one best matching palette color.

Figure 15:
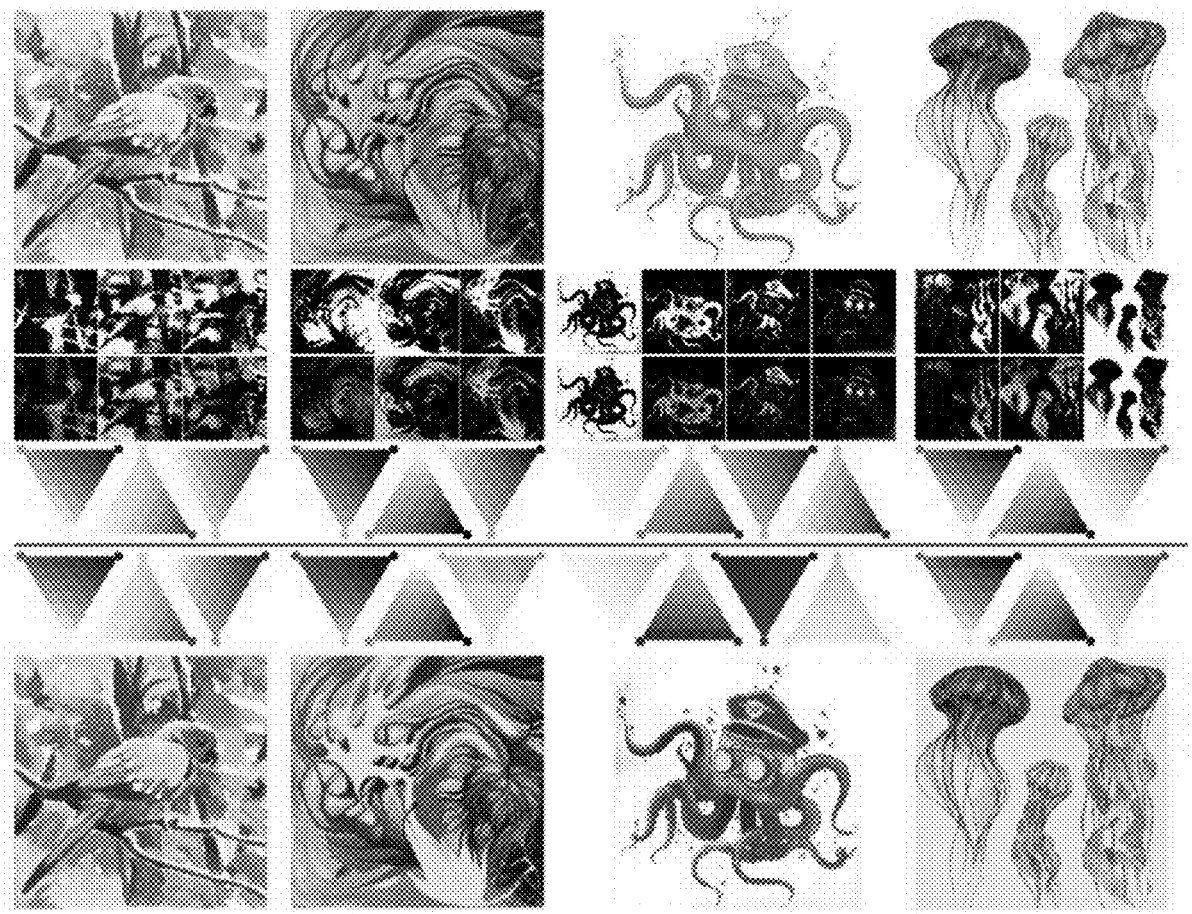
FIG. 15 illustrates example results from for both joint alpha and color sail predictions of experimental datasets.

Results from the current example, for both joint alpha and color sail predictions are shown in FIG. 15. In each column, starting from the top, in FIG. 15 shows: an original image; a predicted alphas as binary masks and as mattes applied to the image; a predicted color sail rig; and image recoloring demonstrations after user interaction with the color sails, where the mapping is determined by our predicted alphas. The results demonstrate various aspects of versatility for recoloring using the system 100. The first image shows a simple recoloring with changes in the color vertices on the sails. The second column and third column demonstrate the effect of changing the patchwork level along with the colors to get more discrete or continuous color distributions respectively. The fourth column demonstrates the value of soft alphas for recoloring the non-trivial background seamlessly.

Advantageously, the present embodiments model each region not as a solid color, but as a wide distribution of colors. Representing each color alpha as a color sail allows additional creative possibilities of not only editing the global color characteristics within the alpha region, but the blending behavior as well. Moreover, because of the data driven approach, the alphas are more semantically related, as the model uses regularities in the data it has assimilated while learning along with the characteristics of the image at hand to produce a color sail rig.

Figure 16:
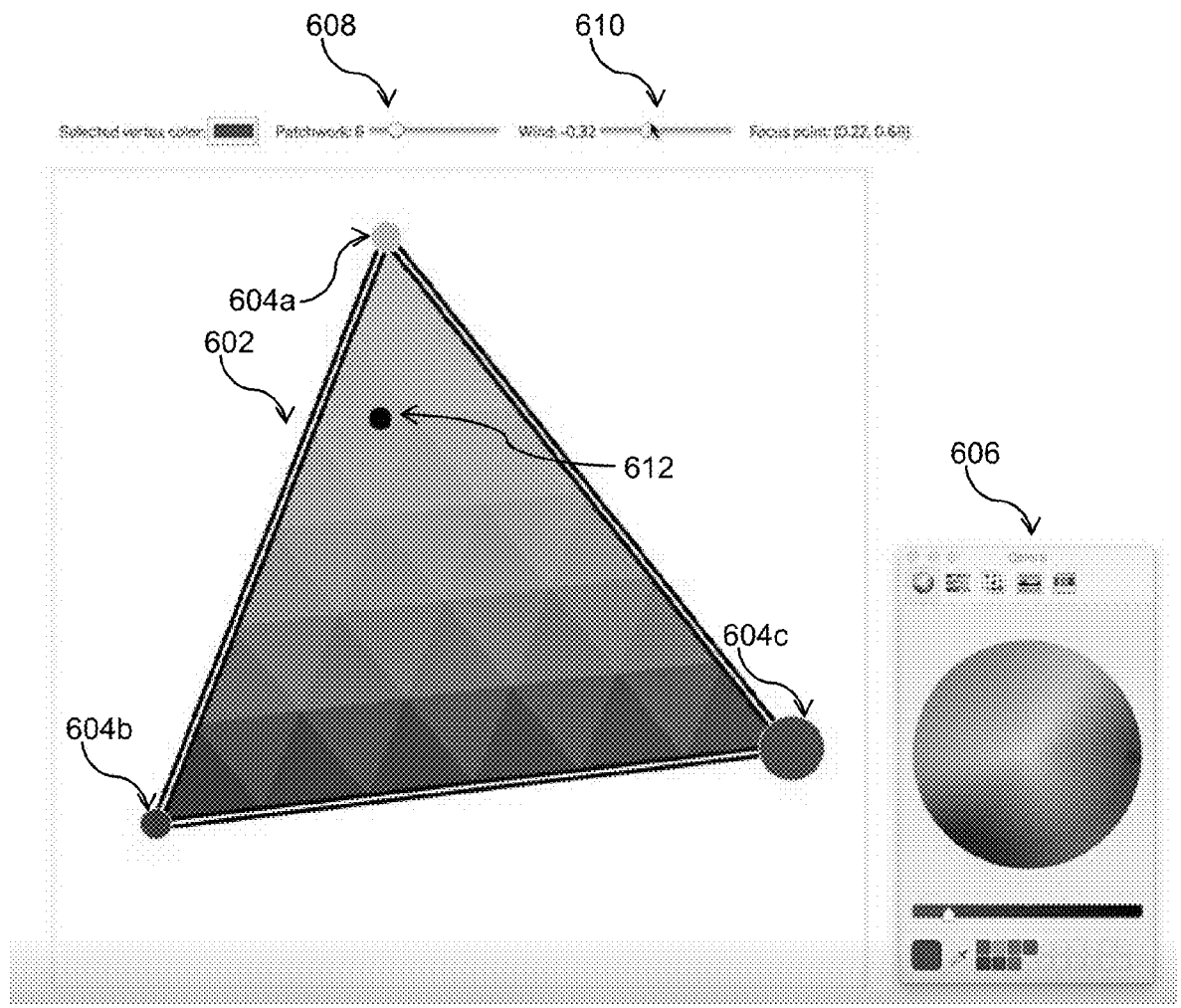
FIG. 16 illustrates a screenshot of an exemplary user interface in accordance with an embodiment of the system of FIG. 1.

FIG. 16 illustrates a screenshot of an exemplary user interface 106 for the system 100 as, for example, provided on a webpage. A color sail 602 is created by selecting three base colors, one for each of its vertices 604a, 604b, and 604c. In this screenshot, the bottom-right vertex 604c is selected and enlarged. The color for this vertex 604c can be selected by the user using the color selection palette 606. By modifying a patchwork parameter 608, the user can modify the level of discretization in the color sail 602, in the range of fully discrete to approximately continuous. Additionally, the user can modify the default color blending behavior of the color sail 602 by modifying a wind parameter 610. Modifying the wind parameter 610 can create a custom blend that can approximate the blending behavior of real paint media. The user can also focus on a particular part of the gradient by moving a focal point parameter 612 to different areas of the color sail 602. In addition, by moving the vertices 604a, 604b, and 604c around on the plane, the color sail 602 will be deformed and the blending of the colors along the plane in the color sail 602 will be automatically changed accordingly.

Figure 17:
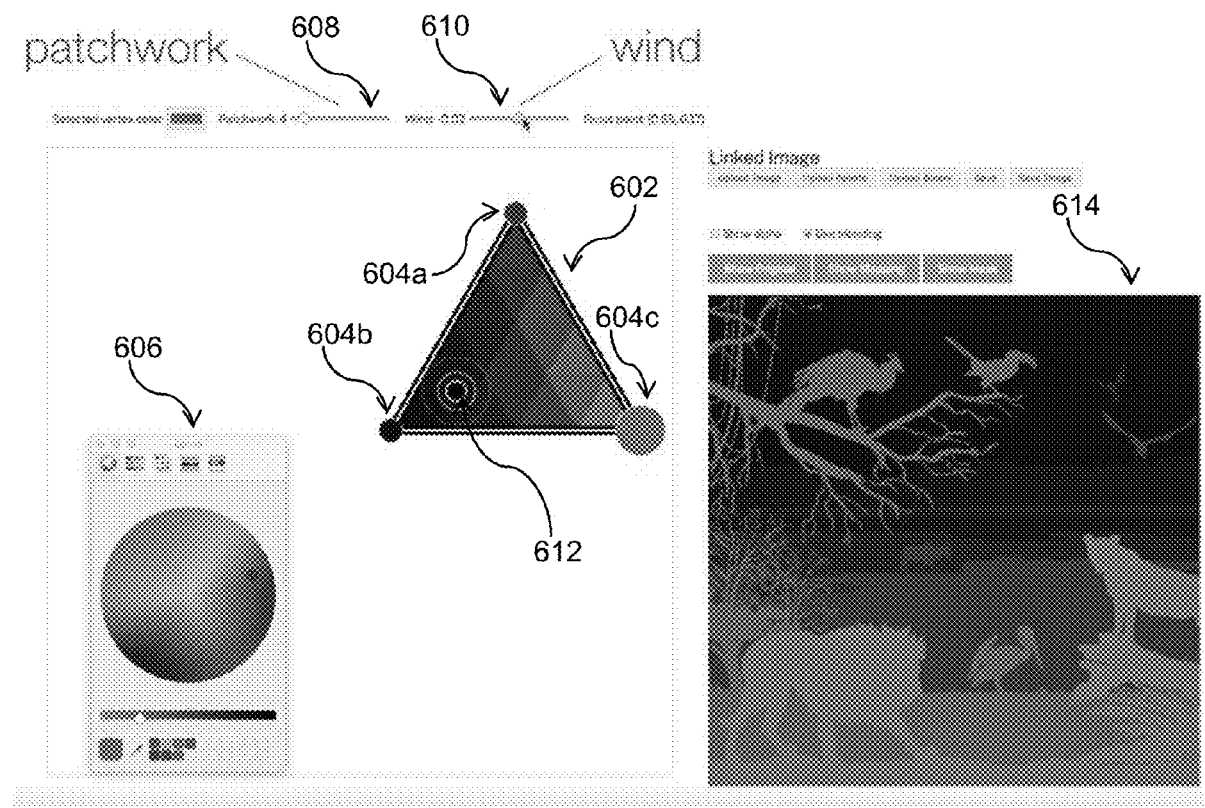
FIG. 17 illustrates a screenshot of an exemplary user interface in accordance with another embodiment of the system of FIG. 1.

FIG. 17 illustrates another screenshot of an exemplary user interface 106 for the system 100. In this case, the first neural network, with the deterministic color sail decoder, are used to learn color distributions found in an image 614 and automatically represent them with a color sail 602. In some cases, the image 614 can be uploaded to the system 100 by the user. Thus, an image 614 to color sail 602 mapping can be used to interactively edit base colors in the image by editing the vertex colors 604a, 604b, and 604c, edit the blending behavior by editing the wind parameter 610 and the focal point 612, and edit the discreteness by editing the patchwork parameter 608.

Figure 18:
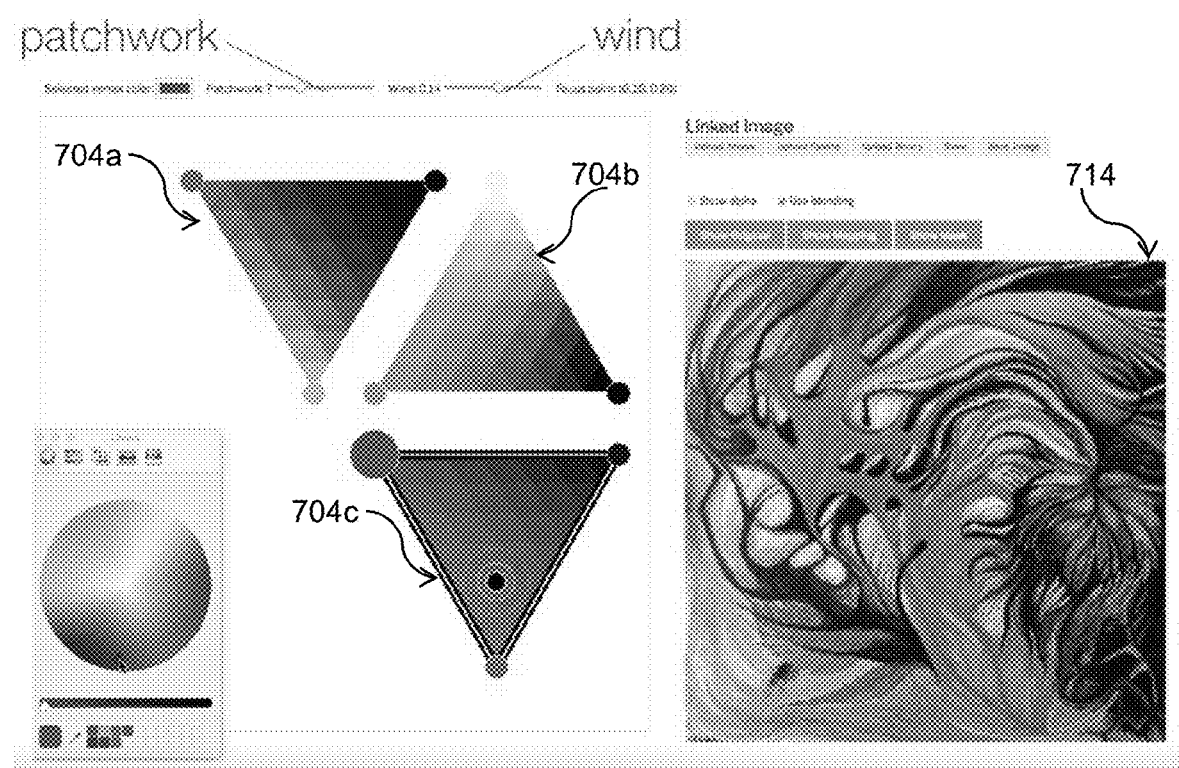
FIG. 18 illustrates a screenshot of an exemplary user interface in accordance with yet another embodiment of the system of FIG. 1.

FIG. 18 illustrates another screenshot of an exemplary user interface 106 for the system 100. In this case, a more complex color distribution of the image 714 is represented by a plurality of color sails 704a, 704b, 704c. In this case, a deep learning architecture is used to for automatic image compositing to produce the plurality of color sails 704a, 704b, 704c. The deep learning model learns to produce alpha masks and corresponding color sails (as illustrated in FIG. 9) so as to best reconstruct the original image 714. In this way, the system 100 can achieve much higher representative power that can model and represent more complex images. FIG. 18 illustrates the three automatically generated color sails 704a, 704b, 704c and their effect on the image 714. By modifying the parameters of any of these color sails 704a, 704b, 704c, as was exemplified above, the image 714 is automatically modified accordingly through interaction with the respective alpha mask.

Figure 3:
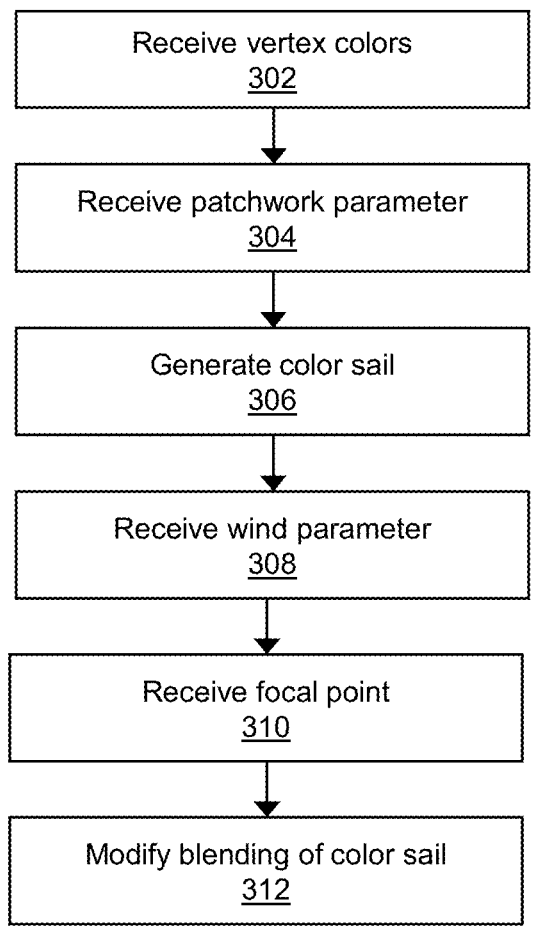
FIG. 3 is a flow chart of a method for color representation generation, in accordance with an embodiment.

FIG. 3 illustrates a method 300 for color representation generation using a color sail, in accordance with an embodiment. At block 302, the representation module 120 receives three colors for each vertex of the color sail. The representation module 120 uses the vertex colors to define a flat triangular face having a color distribution between the vertices in a color space.

At block 304, the representation module 120 receives a patchwork parameter representing a level of discretization of the color distribution. At block 306, depending on the level of discretization denoted by the patchwork parameter, the representation module 120 generates a color sail by placing the vertex colors at each vertex of the triangular space and defines a color for each discrete portion of the color sail. Where each discrete portion has an interpolated color defined as a linear, or in some cases non-linear, combination of the vertex colors at barycentric coordinates of the discrete portion.

At block 308, the representation module 120 receives a wind parameter representing a blending behavior of the color distribution. At block 310, the representation module 120 receives a focal point in the triangular face representing a focus of the blending of the color distribution. The focal point represents barycentric coordinates of a point on which the wind parameter is acting, thus biasing blending interpolation toward the color closest to the focal point. At block 312, the representation module 120 modifies blending of the color distribution in the color sail based on the wind parameter and the focal point, for example, using a cubic Bezier triangle.

In some cases, the system can receive changes to one or more of the parameters from the user and change the color sail accordingly; such as changes to the base colors associated with each vertex, the patchwork parameter, the wind parameter, or the focal point.

In some cases, there may be a default value at initiation for any one or more of the parameters; for example, color for each vertex, patchwork parameter, wind parameter, and focal point.

Figure 19:
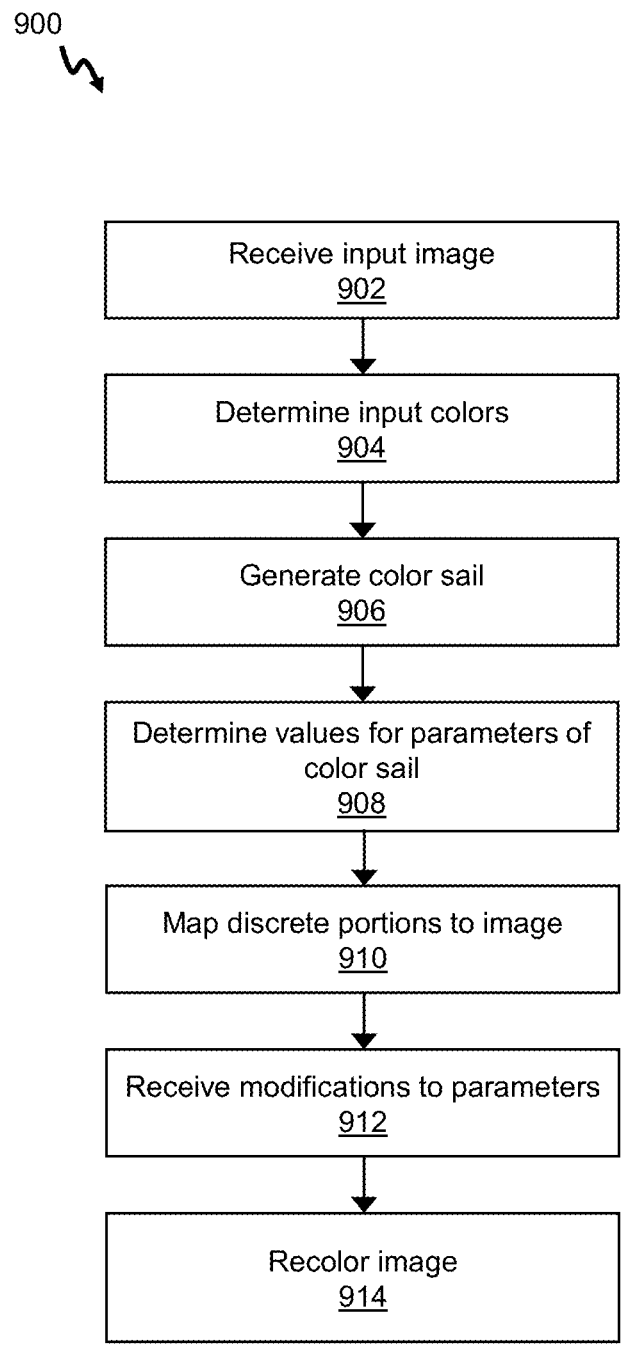
FIG. 19 is a flow chart of a method for color representation generation, in accordance with another embodiment.

FIG. 19 illustrates a method 900 for color representation generation using a color sail, in accordance with another embodiment. At block 902, the mapping module 122 receives an input image.

At block 904, the mapping module 122 determines a set of input colors in the input image. In some cases, all the colors in an image can be sampled, and in other cases, a subset of colors in an image can be sampled (for example, randomly selecting subsets of colors). As the histogram is normalized, it should not affect the outcome as long as there are enough samples.

At block 906, the representation module 120 generates a color sail having a color distribution determined by a set of parameters comprising a base color at each of the three vertices, a patchwork parameter, and in some cases, a focal point and a wind parameter.

At block 908, using a trained first neural network, the mapping module 122 determines a value for the plurality of parameters of the color sail that minimize an error metric between the input colors and the colors in a color distribution of the color sail.

At block 910, after the representation module 120 generates the color sail, the mapping module 122, for each pixel or group of pixels in the image, determines the discrete portion of the color sail with a color that is closest to that pixel or group of pixels.

At block 912, the user interface 106 receives a modification to any one or more of the parameters of the color sail from the user.

At block 914, the representation module 120 recolors each pixel (or group of pixels) in the image to the color value of the associated discrete section of the color sail.

Figure 20:
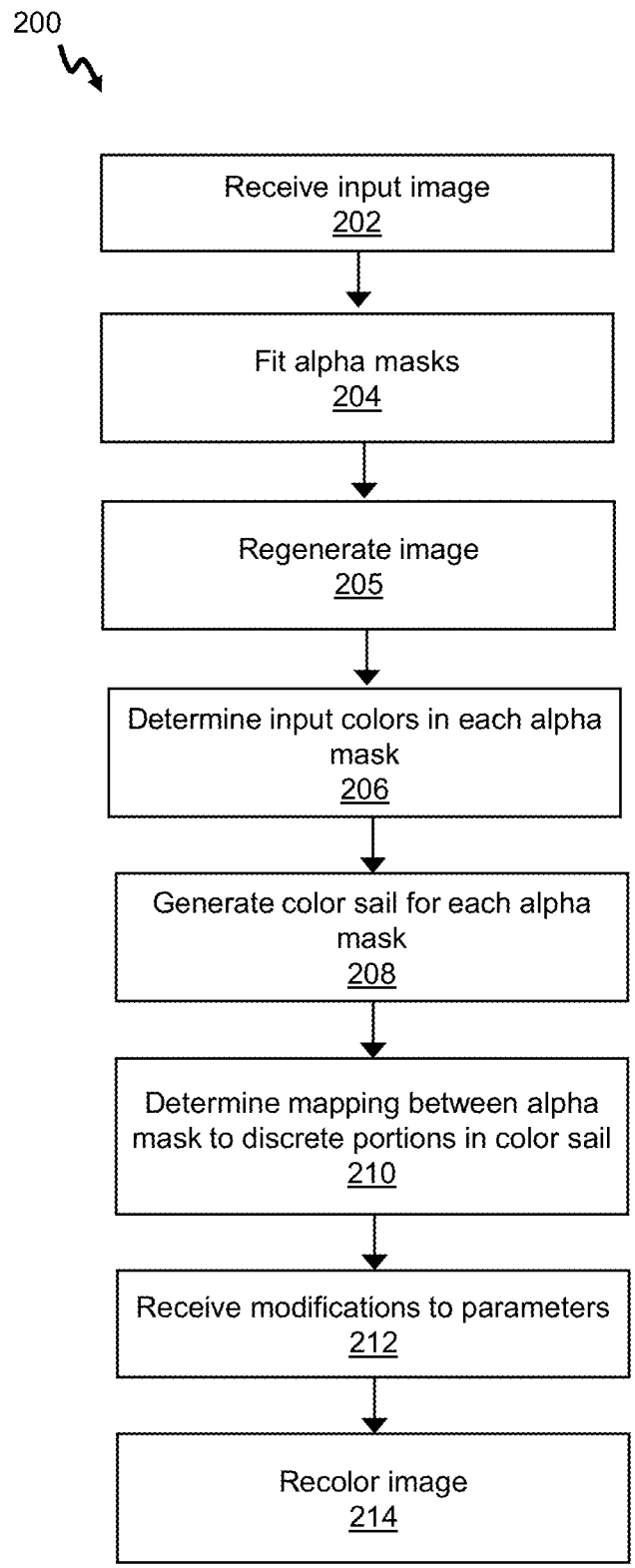
FIG. 20 is a flow chart of a method for color representation generation, in accordance with yet another embodiment.

FIG. 20 illustrates a method 200 for color representation generation using a color sail, in accordance with another embodiment. At block 202, the representation module 120 receives an input image.

At block 204, using a trained second neural network, the mapping module 122 fits (maps) one or more alpha masks to one or more color regions of the input image.

At block 205, the representation module 120 regenerates the image using a stacking of the one or more alpha masks.

At block 206, the mapping module 122 determines one or more input colors in each of the alpha masks.

At block 208, the representation module 120 generates a color sail for each of the alpha masks, using a trained first neural network, by having the mapping module 122 determine a value for the plurality of parameters of each of the color sails that minimize an error metric between the input colors of the associated alpha mask and the colors in a color distribution of such color sail.

At block 210, the mapping module 122, for each pixel or group of pixels in each of the alpha masks image, determines the discrete portion of the associated color sail with a color that is closest to that pixel or group of pixels.

At block 212, the user interface 106 receives a modification to any one or more of the parameters of any one or more of the color sails from the user.

At block 214, if such modifications affect a pixel or group of pixels in one or more of the alpha masks, the representation module 120 recolors such pixel or group of pixels to the color value of the associated discrete section of the color sail.

In further embodiments, the color representations described herein can be used for any suitable application of color picking and/or recoloring. For example, to dynamically color images on websites. In this example, color representations could be used on the server side to modify color schemes of images and entire websites based on some parameters passed to the server.

In the above example, a user could upload an image to a server 32 via the user interface 106. As described herein, the system 100 would fit one or more color sails and alpha masks to this uploaded image. The user could then modify the alpha masks, or specify their own, and the system 100 can re-fit the color sails to the finalized mask regions. For each color sail, in some cases, the user can specify ranges of colors each vertex can have; for example, colors within a certain radius of the original vertex point in RGB or another color space, or a discrete set of colors, or an ability to change just an aspect of the color such as the hue. In some cases, the system 100 can provide the user with a dynamic image URL for the image as modified. In some cases, the URL can have certain parameters appended thereto; for example, such parameters can be numerical values in a given set specified by the user. In an example, the suer can specify a parameter set 'time_of_day': [0-24], and 'age': [0-150]. The user can then embed this URL in their application; for example, by dynamically setting such parameters on the server side when serving HTML or in JavaScript based on what is known about the user of their website. The server can then serve a dynamically recolored image from that URL. In some cases, the user can also be provided with a JavaScript API, where they can track certain metrics, like CTR, by sending a request to the server, such as: colorsails.sendTrackingInfo (<user-provided-session-id>, information). The server initially can generate recolorings by randomly changing colors within the bounds specified by the user. In some cases, over time, the system 100 can build an intelligent recoloring model that can change colors in order to optimize certain metrics by using tracking information sent by a plurality of users. For example, the system 100 can learn that at night, CTR is higher on brighter images and recolor user images accordingly. The system 100 can also use a separate neural network to condition recoloring on the image context by learning from successful recolorings done in the past. This advantageously allows the system 100 to get and use aggregate insights about color usage and user engagement.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A computer-implemented method for generating a color representation, the method comprising:
   a receiving an input image;
   determining a color representation for each region of the input image using a trained artificial neural network, the trained artificial neural network comprises a U-net architecture comprising a first neural network and a second neural network, the trained artificial neural network taking as input a histogram of the respective region and outputting the respective color distribution, second neural network trained to determine alpha masks to determine regions of the image associated with each color representation, each color representation having one of three base colors at each respective vertex of a triangular face, the triangular face having a color distribution therein, the color distribution discretized into discrete portions, the amount of discretization based on a patchwork parameter, each discrete portion having an interpolated color determined to be a combination of the base colors at respective coordinates of such discrete portion, the first neural network trained to encode and decode the histogram for each alpha mask to determine the base colors of the color distribution, discretization of the color distribution, and the patchwork parameter; and
   outputting the color representations.

2. The method of claim 1, wherein the first neural network is trained to minimize an error metric between colors of the respective region of the input image and the three base colors.

3. The method of claim 2, wherein the colors of the respective region of the input image are represented by a deformed planar patch of Red-Green-Blue space.

4. The method of claim 1, wherein the alpha mask comprises a grayscale image, and the sum of all alpha masks for each pixel is 1.

5. The method of claim 1, wherein the combination of the base colors for each discrete portion comprises a linear combination of the base colors.

6. The method of claim 1, wherein the first neural network further determines a wind parameter, and wherein blending behavior of the color distribution is determined based on the wind parameter acting at a focal point.

7. The method of claim 1, wherein the blending behavior uses a cubic Bezier triangle.

8. The method of claim 1, wherein a softmax function is applied across channels at every pixel of the alpha masks.

9. A system for generating a color representation, the system comprising one or more processors and a data storage, the one or more processors configured to execute:
   a mapping module to use a trained artificial neural network to determine alpha masks each representing a region of a received input image, each alpha mask associated with a color representation, the trained artificial neural network comprises a U-net architecture, the U-net architecture comprises a first neural network and a second neural network, the second neural network trained to determine the alpha masks for each region; and
   a representation module to determine the parameters of the color representation associated with each region of the input image using the trained artificial neural network, the trained artificial neural network taking as input a histogram of the respective region and outputting the respective color distribution, each color representation having one of three base colors at each respective vertex of a triangular face, the triangular face having a color distribution therein, the color distribution discretized into discrete portions, the amount of discretization based on a patchwork parameter, each discrete portion having an interpolated color determined to be a combination of the base colors at respective coordinates of such discrete portion, and outputting the color representations, the first neural network trained to encode and decode the histogram for each alpha mask to determine the base colors of the color distribution, discretization of the color distribution, and the patchwork parameter.

10. The system of claim 9, wherein the first neural network is trained to minimize an error metric between colors of the respective region of the input image and the three base colors.

11. The system of claim 10, wherein the colors of the respective region of the input image are represented by a deformed planar patch of Red-Green-Blue space.

12. The system of claim 9, wherein the alpha mask comprises a grayscale image, and the sum of all alpha masks for each pixel is 1.

13. The system of claim 9, wherein the combination of the base colors for each discrete portion comprises a linear combination of the base colors.

14. The method of claim 9, wherein the first neural network further determines a wind parameter, and wherein blending behavior of the color distribution is determined based on the wind parameter acting at a focal point.

16. The system of claim 9, wherein the blending behavior uses a cubic Bezier triangle.

16. The system of claim 9, wherein a softmax function is applied across channels at every pixel of the alpha masks.

* * * * *